United States Patent
Kandi et al.

(10) Patent No.: US 12,197,467 B2
(45) Date of Patent: Jan. 14, 2025

(54) LIFE CYCLE MANAGEMENT FOR STANDBY DATABASES

(71) Applicant: Rubrik, Inc., Palo Alto, CA (US)

(72) Inventors: Bala Sunil Kandi, Dublin, CA (US); Peter John Milanese, Effort, PA (US)

(73) Assignee: Rubrik, Inc., Palo Alto, CA (US)

( * ) Notice: Subject to any disclaimer, the term of this patent is extended or adjusted under 35 U.S.C. 154(b) by 1 day.

(21) Appl. No.: 17/592,923

(22) Filed: Feb. 4, 2022

(65) Prior Publication Data
US 2023/0252045 A1    Aug. 10, 2023

(51) Int. Cl.
*G06F 16/27*    (2019.01)
*G06F 11/14*    (2006.01)

(52) U.S. Cl.
CPC ........ *G06F 16/273* (2019.01); *G06F 11/1469* (2013.01); *G06F 2201/84* (2013.01)

(58) Field of Classification Search
CPC . G06F 16/273; G06F 11/1469; G06F 2201/84
See application file for complete search history.

(56) References Cited

U.S. PATENT DOCUMENTS

| | | | |
|---|---|---|---|
| 10,346,085 B1* | 7/2019 | Teverovsky | G06F 11/1438 |
| 2016/0078068 A1* | 3/2016 | Agrawal | G06F 3/0641 |
| | | | 707/692 |
| 2017/0116220 A1* | 4/2017 | Wong | G06F 11/1471 |
| 2020/0250046 A1* | 8/2020 | Wong | G06F 11/1453 |
| 2022/0083657 A1* | 3/2022 | Karr | G06F 21/64 |

* cited by examiner

*Primary Examiner* — Apu M Mofiz
*Assistant Examiner* — Cindy Nguyen
(74) *Attorney, Agent, or Firm* — Holland & Hart LLP

(57) ABSTRACT

Methods for establishing a second database and maintaining synchronization between a first database and the second database in a data management system are described. According to the method, a snapshot of a state of the first database may be acquired and mounted to a second server. The second database may be restored to the second server based on the mount. The second database may replicate the state of the first database. Synchronization may be enabled between the first database and the second database. One or more metrics associated with replication of data between the databases may be identified. A backup process for transaction logs associated with the first database may be initiated and the transaction logs may be mounted to the second server based on the metrics. One or more transactions may be applied to the second database based on the transaction logs mounted to the second server.

18 Claims, 14 Drawing Sheets ion between such databases, or both. To support
setup of a multi-database system for data management, the
data management system may verify that prerequisites for
establishing a secondary (e.g., standby, target) database are
met. For example, the data management system may verify
certain compatibilities between the secondary database and
a primary (e.g., source, production) database, between a
secondary host server that hosts the secondary database and
a primary host server that hosts the primary database, or
both. Additionally or alternatively, the data management
system may verify one or more prerequisite parameters
associated with the primary database, the primary server, the
secondary server, or any combination thereof, such as a
mode, a storage capacity, a state of software (e.g., a software
version), or any combination thereof of the primary database, the primary server, the secondary server, or any
combination thereof. If the prerequisites are met, the data
management system may acquire a snapshot of a current
state of the primary database. That is, the data management
system may perform an incremental or non-incremental
backup of the primary database. The data management
system may mount the snapshot of the primary database on
the secondary host server. The mount of the snapshot on the
secondary host server may correspond to an instance of the
secondary database on the secondary server and may include
data logs and transaction logs associated with the primary
server. In some examples, the mount of the snapshot may be
referred to as a live mount.

LIFE CYCLE MANAGEMENT FOR STANDBY DATABASES

FIELD OF TECHNOLOGY

The present disclosure relates generally to database systems and data processing, and more specifically to life cycle management for standby databases.

BACKGROUND

A data management system may be a computing system employed to manage, process, backup, and restore data using a network of computing devices.

Some data management systems may utilize multiple databases for data backup and restoration. In some examples, a secondary database may act as a backup for a primary database in the data management system. Data may be replicated from the primary database to the secondary database. Configuration of the secondary database may be relatively costly and inefficient. Additionally, synchronization between databases may be lost due to a lost network connection or other corruption in the data management system.

DETAILED DESCRIPTION

Figure 1:
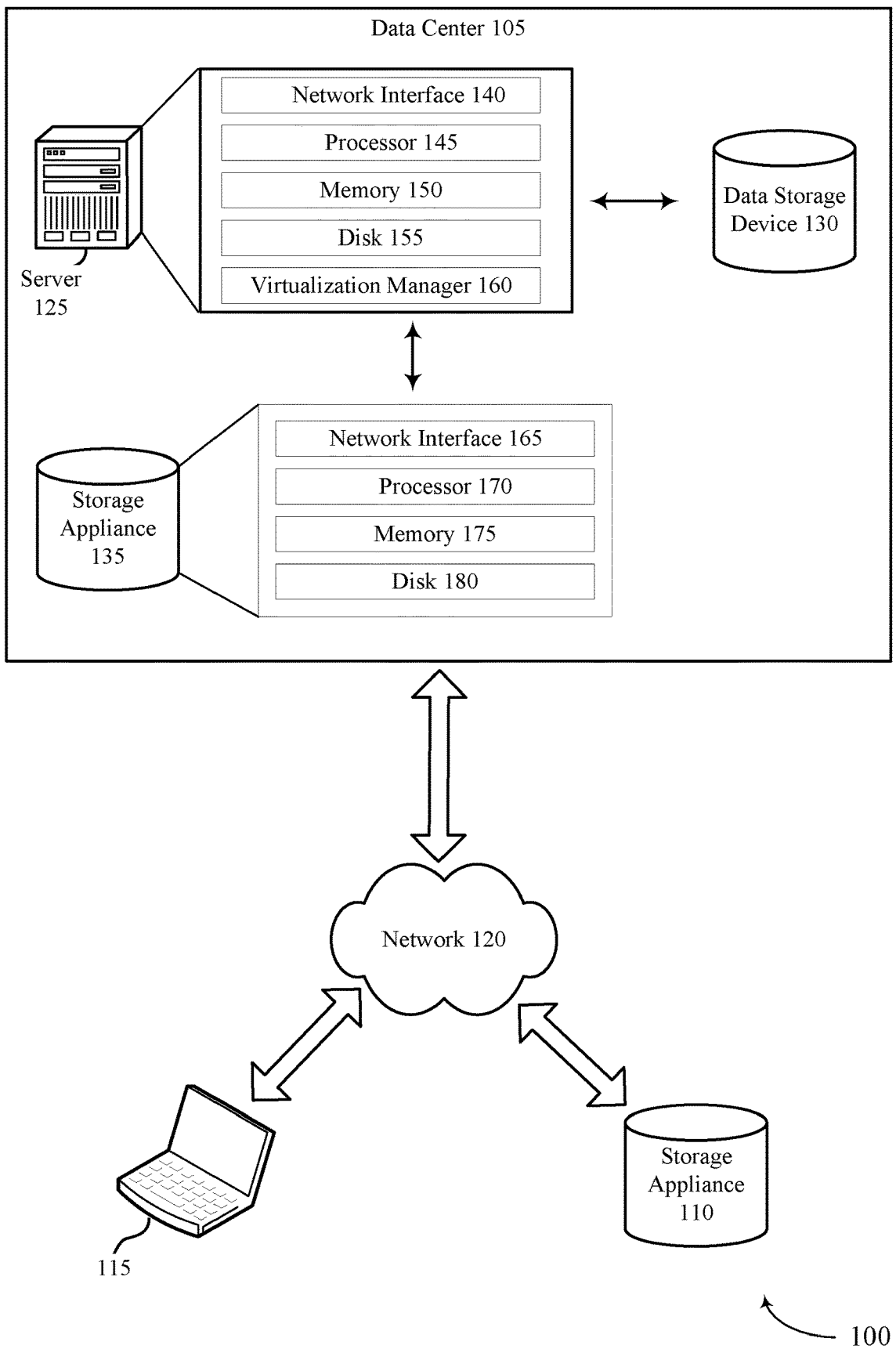
FIG. 1 illustrates an example of a computing environment that supports life cycle management for standby databases in accordance with aspects of the present disclosure.

A data management system may include one or more databases for data storage. In some examples, a primary database may store data backups and a secondary database may operate as a standby database to support data recovery when the primary database is unavailable (e.g., due to a disaster, maintenance event, or other disruption). In some systems, setting up a primary and secondary database may be relatively complex. Additionally or alternatively, a secondary database may either initially be out of sync or at some later time become out of sync with a primary database, which may reduce reliability of backups in the system.

Techniques described herein provide for a data management system to support reduced complexity and improved reliability in connection with setting up such multi-database systems for data management, thereafter maintaining synchronization Database configuration settings may be applied to the primary database and the instance of the secondary database mounted on the second server to support replication of data between the databases. The data management system may apply the configuration settings before synchronization is enabled between the databases. The data management system may generate (e.g., restore) the secondary database on the secondary host server from the mount. After generating the secondary database on the secondary host server, the data management system may enable synchronization between the primary database and the secondary database according to the database configuration settings.

To maintain reliable and efficient synchronization between the databases, the data management system may perform metadata scans to identify replication (e.g., synchronization) metrics associated with replication of data between the primary database and the secondary database (e.g., lags, errors, etc.). If issues are identified, the data management system may initiate a process to backup transaction logs (e.g., archive logs) for the primary database. The data management system may mount the transaction logs on the secondary server. The mount of transaction logs may, in some examples, be referred to as a log mount. The transaction logs may then be restored to the secondary database on the secondary server from the mount and applied to the secondary database. The transaction logs applied to the secondary database may repair differences between the primary database and the secondary database. Thus, the described techniques may provide for relatively efficient and reliable setup and synchronization between a secondary database and a primary database within a data management system.

Aspects of the disclosure are initially described in the context of an environment supporting an on-demand database service. Aspects of the disclosure are further described with reference to a data management system illustrating an architecture of a system that supports life cycle management for standby databases and process flows that describe methods for supporting life cycle management for standby databases. Aspects of the disclosure are further illustrated by and described with reference to apparatus diagrams, system diagrams, and flowcharts that relate to life cycle management for standby databases.

FIG. 1 illustrates an example of a computing environment 100 for cloud computing that supports life cycle management for standby databases in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the storage appliance 135 may support virtual machine backup via snapshots and replication. To support virtual machine backup and replication, the storage appliance 135 may support a failover procedure service that is used to orchestrate the replication of a virtual machine environment at a new location (e.g., a target computing system such as another storage appliance 135, server 125, or data storage device 130). The procedure uses an agent executing on a source computing system (e.g., another storage appliance 135 or the server 125) to determine configurations and an agent on the target cluster to install various configurations. Because the agent is executing on the source machine that is snapshotted for virtual machine replication, the agent is installed in the target system. However, some administrators are hesitant to use agents due to the agents having root privileges. Further, only snapshots that had the agents enabled can be used for recovery on the target using the failover procedure service. The example illustrated in FIG. 1 shows one example each of various devices and systems (e.g., one data center 105, one server 125, one data storage device 130, and so on), but is to be understood that a networked computing environment 100 may include any quantity of any device, system, or other aspect illustrated in the example of FIG. 1.

Techniques described herein may support data synchronization between two or more databases within the data center 105 (or multiple data centers 105) of the networked computing environment 100. To establish data synchronization, a secondary database (e.g., a second data storage device 130) may be restored to a secondary server 125 that is compatible with a primary server 125 hosting a primary database (e.g., a first data storage device 130). For example, a cloud data management (CDM) service (e.g., as implemented at storage appliance 135, storage appliance 110, or both) may be operable to acquire and store snapshots of the primary database. A data management system, which may comprise an application running on the storage appliance 135, the storage appliance 110, or both, may mount a recent snapshot of the primary database to the secondary server 125. The mounted snapshot may correspond to an instance of the secondary database. Configuration settings may be applied to the primary database and the instance of the secondary database to support data synchronization. The secondary database may be restored to the secondary server 125 and data synchronization may be enabled between the primary database and the secondary database based on the applied configuration settings.

Data may be replicated from the primary database to the secondary database (e.g., from a first data storage device 130 to a second data storage device 130 using a network connection). To maintain reliable synchronization, the data management system may initiate a metadata scan for both the primary database and the secondary database. The metadata may be indicative of replication metrics associated with a state of replication of data between the databases. A re-synchronization repair procedure may be initiated based on the metrics. For example, a backup of transaction logs associated with the primary database may be obtained and mounted to the secondary server. Transactions may be applied to the secondary database based on the mount of the transaction logs to the secondary server. The transactions may re-synchronize the secondary database with a current state of the primary database to ensure near-continuous data protection.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
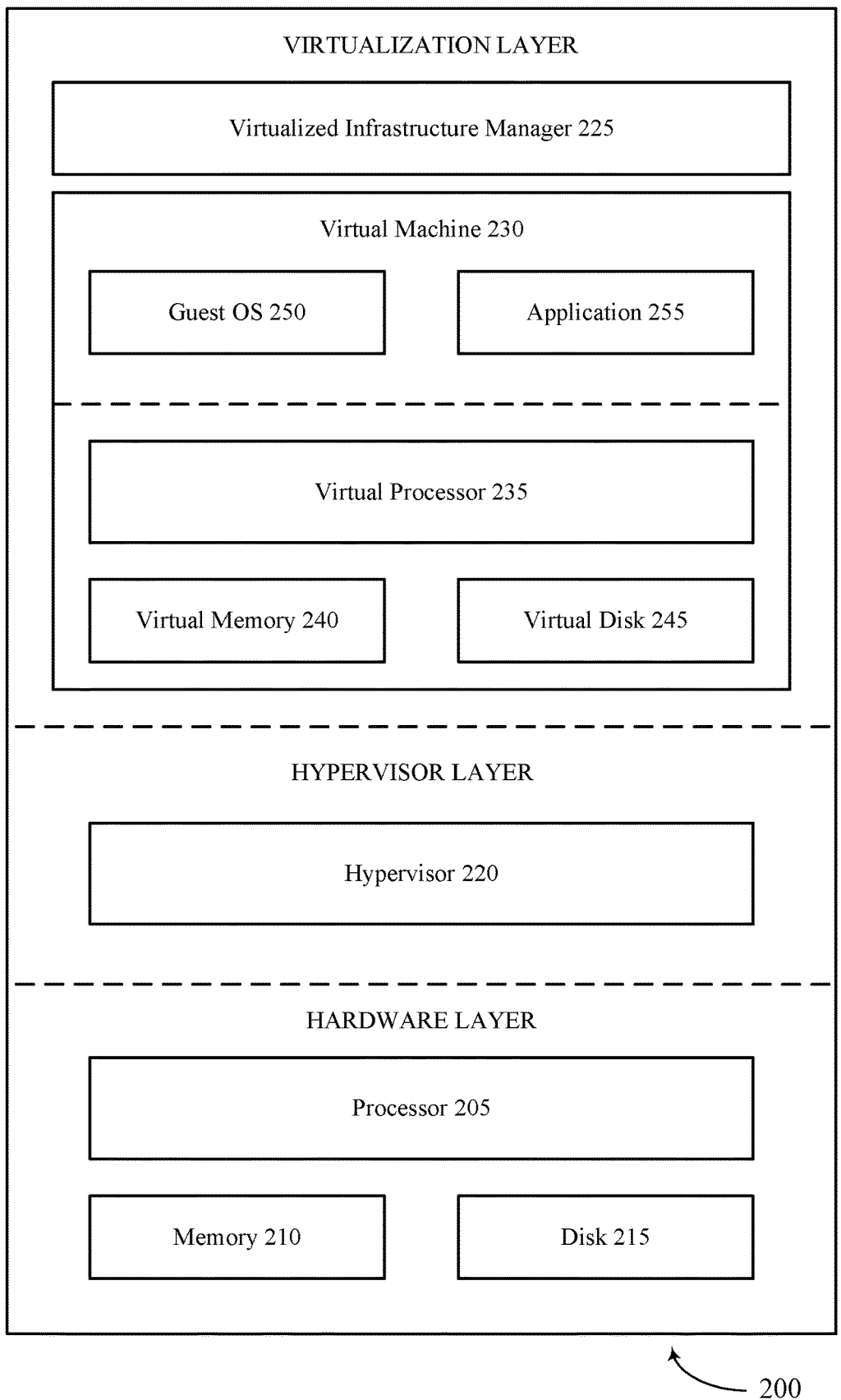
FIG. 2 illustrates an example of a server that supports life cycle management for standby databases in accordance with aspects of the present disclosure.

FIG. 2 illustrates an example of a server 200 that supports life cycle management for standby databases in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance).

In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, a data management application running on a storage appliance, such as storage appliance 110 in FIG. 1 or storage appliance 135 in FIG. 1, may manage backup and restoration of enterprise data associated with the server 200, one or more other servers 200, or both. For example, the server 200 may be operable to host or manage a database for storing data, such as a data storage device 130 in FIG. 1. A CDM service implemented on the storage appliance may be operable to acquire backups of one or more databases hosted by the server 200, one or more other servers 200, or both. The CDM service may obtain or acquire a snapshot or other backup of a primary database (e.g., a source database) hosted by the server 200. To support reliable data protection, the data management application may configure a secondary database that is synchronized with the primary database based on the backups of the primary database obtained by the CDM service. The data management application may mount the one or more backups (e.g., snapshots or images) of the primary database to a secondary server 200 (e.g., a target server) for hosting the secondary database. The data management application may configure the databases and servers 200 to support data synchronization and may subsequently restore the secondary database to the secondary server 200 using the mount. The secondary database may replicate a state of the primary database at a time at which the backup was acquired. The data management application may enable the data synchronization, and data may be replicated from the primary database to the secondary database.

The data management application may acquire metadata associated with the primary and secondary databases to identify replication metrics associated with replication of data between the databases. If the replication metrics indicate an issue or error associated with the replication, the data management system may acquire a backup of transaction logs associated with the primary database and mount the transaction logs to the secondary server 200. The data management system may restore the transaction logs from the mount to the secondary server 200 to bring the secondary database in sync with the primary database. Accordingly, the described techniques may provide for reduced complexity and improved reliability in connection with setting up multi-database systems across one or more servers 200 for data management, thereafter maintaining synchronization between such databases, or both.

Figure 3:
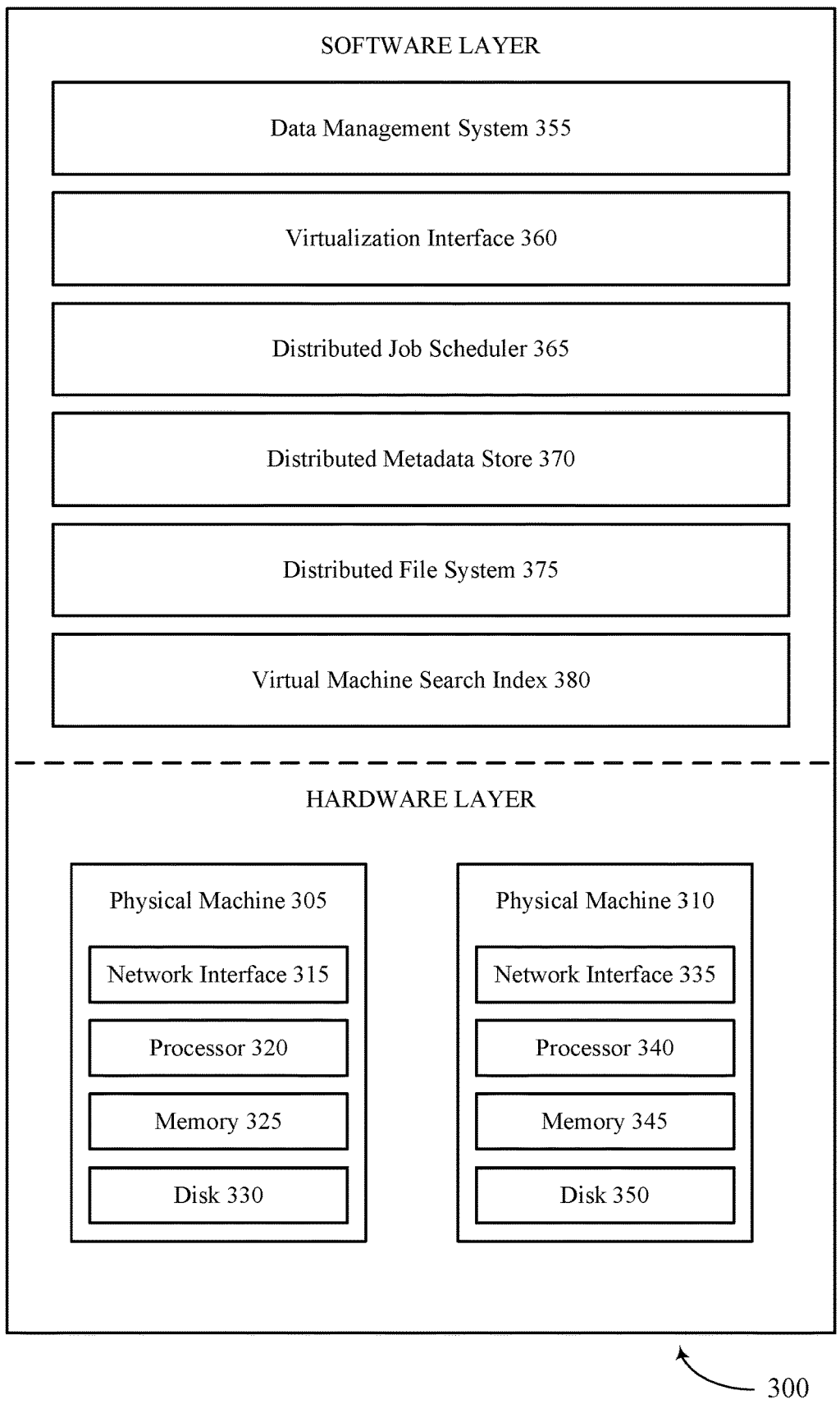
FIG. 3 illustrates an example of a storage appliance that supports life cycle management for standby databases in accordance with aspects of the present disclosure.

FIG. 3 illustrates an example of a storage appliance 300 that supports life cycle management for standby databases in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/sl/sl.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support life cycle management for standby databases. In some cases, the data management system 355 running on the storage appliance 300 may manage one or more databases that store enterprise data across one or more servers 200, as described with reference to FIGS. 1 and 2. The data management system 355 may configure a secondary database hosted by a secondary server that is operable to synchronize with a primary database hosted by a primary server for improved data backup reliability. The data management system 355 may acquire a backup of the primary database (e.g., in the form of a snapshot) and may mount the backup to the secondary server. The backup may correspond to a snapshot or image of the primary database and may be stored in a memory 325 or 345 of a physical machine 305 or 310. The data management system 355 may configure the primary database and an instance of a secondary database associated with the mount on the secondary server to support data synchronization. The data management system 355 may subsequently restore the secondary database to the secondary server using the instance of the secondary database and enable synchronization between the secondary database and the primary database.

To maintain reliable synchronization between the primary and secondary databases, the data management system 355 described herein may perform periodic or semi-periodic metadata scans to identify metrics associated with a state of replication between the primary and secondary databases. In some examples, the metadata, the metrics, or both may be managed by (e.g., acquired and/or stored by) a distributed metadata store 370. The data management system 355 may initiate a backup for transaction logs associated with the primary database and mount the transaction logs to the secondary server based on the metrics. The data management system 355 may apply one or more transactions to the secondary database based on the transaction logs mounted to the secondary server to re-synchronize the secondary database with the primary database. The described procedures may provide for reduced complexity and processing associated with configuring a secondary database. Additionally or alternatively, the described procedures may provide for improved reliability of backed up enterprise data due to improved synchronization between databases.

Figure 4:
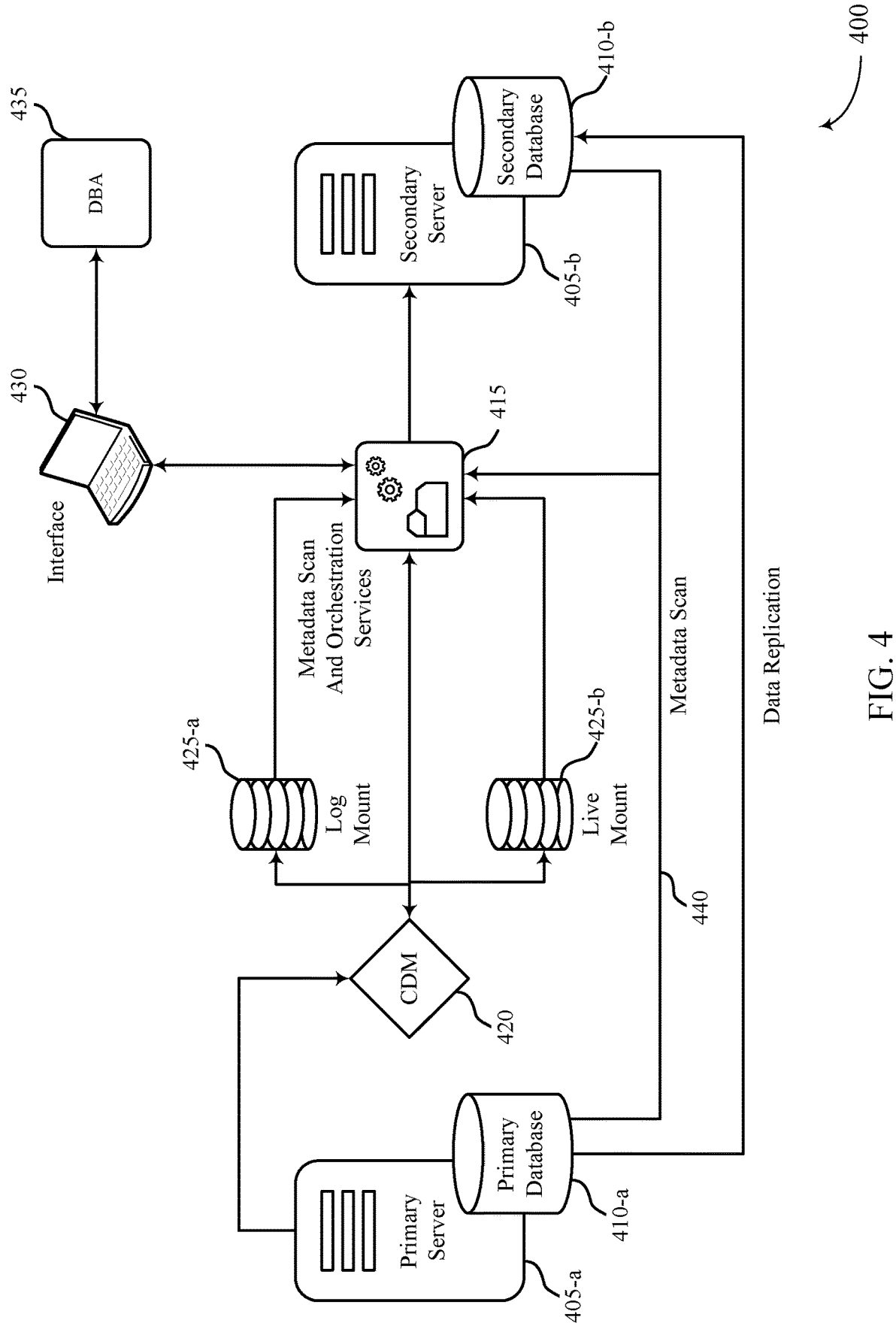
FIG. 4 illustrates an example of a data management system that supports life cycle management for standby databases in accordance with aspects of the present disclosure.

FIG. 4 illustrates an example of a data management system 400 that supports life cycle management for standby databases in accordance with aspects of the present disclosure. In some examples, the data management system 400 illustrates an example architecture of components within a system for backing up and restoring data as described herein. The data management system 400 includes a primary server 405-a and a secondary server 405-b, which may represent examples of a server 125, a storage appliance 135, a server 200, a storage appliance 300, or any combination thereof as described with respect to FIGS. 1 through 3. The primary server 405-a may host a primary database 410-a. The secondary server 405-b may host a secondary database 410-b. The data management system 400 also illustrates metadata scan and orchestration services 415 and a CDM service 420, which may be implemented by a network connecting the primary server 405-a and the secondary server 405-b, by a storage appliance (e.g., storage appliance 135 and 300) described with respect to FIGS. 1 through 3, or both.

The data management system 400 may support data management and recovery of enterprise data for one or more customers. For example, the data management system 400 may include one or more databases 410 that support data backup and recovery for use cases such as disaster recovery, high availability, and load balancing. In some cases (e.g., systems that support Oracle Data Guard, GoldenGate, Attunity, Qlik, or other data replication techniques), the data management system 400 may include a primary (e.g., source, first, production) database 410-a and a secondary (e.g., target, second, standby) database 410-b. The data management system 400 may monitor the secondary database 410-b to enable the primary database 410-a to survive disasters and other corruption. For example, the data management system 400 may maintain the secondary database 410-b as a copy of the primary database 410-a. If the primary database 410-a becomes unavailable for data recovery, the data management system 400 may switch to utilizing the secondary database 410-b as a primary database. The secondary database 410-b may thereby be used as a backup for applications previously running on the primary database 410-a. In some examples, the data management system 400 may include more than one secondary database 410-b (not pictured in FIG. 4).

In some cases, such data replication techniques may not be integrated with solutions for data protection. For example, initial setup of some data replication systems may not be standardized, or may be associated with multiple relatively complex steps, which may increase costs and reduce efficiency associated with a data management system 400. In some cases, a database administrator (DBA) 435 that manages data stored within the data management system 400 may manually transfer or replicate data from the primary database 410-*a* to the one or more secondary databases 410-*b*. In one example, a DBA 435 or another enterprise manager may generate custom scripts to manually process and replicate data, which may be relatively complex, costly, and inefficient.

Additionally or alternatively, once a secondary database 410-*b* is setup, some systems may not support reliable synchronization of data and transactions between the primary database 410-*a* and the secondary database 410-*b*. For example, some data replication applications may dynamically (e.g., periodically, semi-periodically) replicate and transfer data files stored on the primary database 410-*a* as well as transactions applied to the primary database 410-*a* from the primary database 410-*a* directly to the secondary database 410-*b*. However, if the network connection is lost, if the primary database 410-*a* is corrupted or disabled, or the like (e.g., a disaster recovery scenario), transactions applied to the primary database 410-*a* during the disaster may not be transferred to the secondary database 410-*b*. In some cases, such transactions may be backed up and stored by a data backup or protection application, such as the CDM service 420, but may be deleted from the CDM service 420 after a time period. As such, the applied transactions may be lost, and complete synchronization between the primary database 410-*a* and the secondary database 410-*b* may not be supported.

Techniques described herein provide for efficient setup of a multi-database system for data protection, as well as reliable (e.g., continuous, near-continuous) synchronization between databases 410. The described techniques may utilize the CDM service 420, the metadata scan and orchestration services 415, or both to improve setup and synchronization between multiple databases 410, which may reduce complexity and manual processes and improve reliability. For example, the CDM service 420, the metadata scan and orchestration services 415, or both may represent examples of software or other infrastructure operable to backup and manage multiple servers 405 and corresponding databases 410 within the data management system 400. The CDM service 420 may be operable to obtain or acquire backups of at least the primary database 410-*a*, and the metadata scan and orchestration services 415 may be operable to verify compatibility between databases 410 and manage replication of data between compatible databases 410. The described techniques may thereby provide for standardized and efficient setup of multiple databases 410, as well as efficient and reliable synchronization of data between the databases 410 (e.g., unbreakable data synchronization).

The data management system 400 described herein may initially include the primary server 405-*a*, the primary database 410-*a*, which may be hosted by the primary server 405-*a*, and a secondary server 405-*b*. In some examples, the data management system 400 may include one or more other servers 405 (not pictured in FIG. 4). The secondary server 405-*b* may be referred to as a target server 405-*b* and may be identified as a potential host for a secondary database 410-*b* to support backing-up, or replicating, the primary database 410-*a* for data protection.

To setup the secondary database 410-*b* on the secondary server 405-*b*, the metadata scan and orchestration services 415, or some other logical entity in the data management system 400, may verify that one or more prerequisites for establishing the secondary (e.g., target, standby) database 410-*b* are met. For example, the metadata scan and orchestration services 415 may verify certain compatibilities between the primary server 405-*a* that hosts the primary database 410-*a* and the secondary (e.g., target, standby) server 405-*b* for hosting the secondary database 410-*b*. The compatibilities may include verifying a network connectivity between the primary host server 405-*a* and the secondary host server 405-*b*, verifying sufficient storage capacity on the secondary host server 405-*b* to support the capacity of the primary database 410-*a*, or both.

Additionally or alternatively, the metadata scan and orchestration services 415 may verify that one or more prerequisite parameters associated with the primary database 410-*a*, the primary server 405-*a*, the secondary server 405-*b*, or any combination thereof are met to ensure the primary database 410-*a* and the corresponding servers 405-*a* and 405-*b* are prepared for data replication and synchronization. The prerequisite parameters may include a mode (e.g., an archive log mode), a storage capacity, a state of software (e.g., a software version), or any combination thereof associated with a state of the primary database 410-*a*, the primary server 405-*a*, the secondary server 405-*b*, or any combination thereof prior to data replication. For example, the metadata scan and orchestration services 415 may verify that transaction logging, database logging, or both, are enabled and supported by the primary database 410-*a* and the primary server 405-*a*.

In some examples, the prerequisites may be verified by a prerequisite checks engine, which may correspond to subset of software or logic within the metadata scan and orchestration services 415 operable to check prerequisites associated with the servers 405 and the primary database 410-*a*. If the prerequisites are not valid or verified, the metadata scan and orchestration services 415 may apply configuration changes to any one or more of the primary server 405-*a*, the secondary server 405-*b*, or the primary database 410-*a* and re-verify the prerequisites.

If the prerequisites are valid and verified, the metadata scan and orchestration services 415 may indicate the verification to the CDM service 420. The CDM service 420 may acquire a snapshot of the primary database 410-*a* at a first point in time after receiving the indication. That is, the metadata scan and orchestration services 415 may instruct the CDM service 420 to back up the primary database 410-*a*.

In some examples, the CDM service 420 may have previously configured backups of the primary database 410-*a*. For example, the CDM service 420 may acquire an initial (e.g., base) snapshot of the primary database 410-*a* and one or more full or incremental snapshots over time (e.g., periodic acquisition of incremental snapshots). The CDM service 420 may store the snapshots for use in generating a backup of the primary database 410-*a* at a given point in time associated with a most recently acquired snapshot, such as the first point in time. As such, in response to the indication, the CDM service 420 may acquire an additional incremental snapshot of the primary database 410-*a* at the first point in time to ensure the backup of the primary database 410-*a* is up to date. Additionally or alternatively, the CDM service 420 may acquire a first snapshot (e.g., a full or base snapshot) of the primary database 410-*a* at the first point in time in response to receiving the indication.

The metadata scan and orchestration services 415 may acquire the backup of the primary database 410-*a* from the CDM service 420. For example, the metadata scan and orchestration services 415 may acquire a base snapshot and additional incremental snapshots that depend from the base snapshot to generate a full image of a state of the primary database 410-a hosted by the primary server 405-a at the first point in time. Additionally or alternatively, the metadata scan and orchestration services 415 may acquire a single incremental or non-incremental snapshot that is representative of a state of the primary database 410-a at the first point in time (e.g., that includes relevant transaction and database files).

The metadata scan and orchestration services 415 may use the backup image or snapshot to generate a mount 425-b including data files and transaction files associated with the state of the primary database 410-a at the first point in time, which may be referred to as a live mount 425-b. Prior to mounting the backup to the secondary server 405-b, the metadata scan and orchestration services 415 may validate the secondary host server 405-b and clean up any other mounts that may currently exist on the secondary host server 405-b. For example, the metadata scan and orchestration services 415 may remove one or more first mounts 425 of one or more files from the secondary server 405-b. The one or more first mounts 425 may correspond to previous states of the primary database 410-a, other files associated with other databases 410, or both.

The metadata scan and orchestration services 415 may mount the backup, or snapshot, of the state of the primary database 410-a at the first point in time to the secondary server 405-b. Mounting the backup may include processing database files and transaction files within the backup and presenting the files to be stored on the secondary server 405-b in the form of the live mount 425-b. Once mounted on the secondary server 405-b, the live mount 425-b of the snapshot may correspond to an instance of the secondary database 410-b on the secondary server 405-b. The instance of the secondary database 410-b may include a replication of the data files and the transaction files associated with the state of the primary database 410-a at the first point in time.

After mounting the snapshot of the primary database 410-a to the secondary server 405-b, the metadata scan and orchestration services 415 may configure the primary database 410-a and the instance of the secondary database 410-b mounted to the secondary server 405-b (e.g., the live mount 425-b) to support data synchronization. That is, the metadata scan and orchestration services 415 may apply a first set of configuration settings (e.g., changes) to the primary database 410-a and a second set of configuration settings to the instance of the secondary database 410-b mounted on the secondary server 405-b. Applying the configuration settings may include applying changes to an archive log mode of the primary and secondary databases 410, applying changes to a state of the primary and secondary databases 410, applying settings to prepare the primary and secondary databases 410 for data replication and synchronization, or any combination thereof. The configuration settings may be applied while data synchronization is disabled between the primary database 410-a and the instance of the secondary database 410-b, and may prepare the instance of the secondary database 410-b to be restored to the secondary server 405-b and synchronized with the primary database 410-a.

After applying the configuration settings, the metadata scan and orchestration services 415 may restore the secondary database 410-b to the secondary server 405-b using the instance of the secondary database 410-b mounted to the secondary server 405-b in the form of the live mount 425-b. Once restored, the secondary database 410-b may include the data files and transaction files from the live mount 425-b. As such, the secondary database 410-b may replicate the state of the primary database 410-a at the first point in time.

The metadata scan and orchestration services 415 may, in some examples, configure a broker between the primary database 410-a and the secondary database 410-b after restoring the secondary database 410-b. The broker may correspond to metadata within the described data replication and backup environment. The metadata scan and orchestration services 415 may manage the broker configuration (e.g., metadata) and utilize the broker configuration to apply and store one or more data replication and protection modes or settings. For example, the data management system 400 may support one or more data protection modes, such as a protection mode for maximum performance, a protection mode for maximum availability, and the like. The metadata scan and orchestration services 415 may utilize the broker configuration to select and store a protection mode in which the system may operate. Stated alternatively, the metadata scan and orchestration services 415 may liberate an existing application protocol interface (API) between the primary server 405-a and the secondary server 405-b to apply the described changes to the data protection mode and/or settings. In some example, the broker configuration on the API may be represented by the metadata scan 440 in FIG. 4.

The metadata scan and orchestration services 415 may subsequently enable data synchronization between the primary database 410-a and the secondary database 410-b based on the first and second sets of configuration settings applied to the primary database 410-a and the instance of the secondary database 410-b, respectively. Accordingly, the described techniques provide for the metadata scan and orchestration services 415 to assist with setting up a secondary database 410-b and enabling data synchronization, which may provide for efficient and reliable setup of a system for data protection and replication.

In some examples, the setup of the secondary database 410-b may be performed or managed by a data guard setup engine, which may represent an example of a subset of software or logic within the metadata scan and orchestration services 415. By utilizing the metadata scan and orchestration services 415 to orchestrate the setup of one or more databases 410, the setup of the data management system 400 may be more efficient, less complex, and less costly than a setup procedure in which replication of data between databases 410 is performed manually by a DBA 435 or other enterprise manager.

Techniques described herein provide for the data management system 400 to maintain reliable and efficient synchronization between the databases 410 after setting up the secondary database 410-b and enabling data synchronization. The described techniques leverage backups of the primary database 410-a obtained by the CDM service 420 to maintain synchronization between the primary database 410-a and the secondary database 410-b, which may improve reliability of the data synchronization as compared with other systems in which the backed up data and transaction files are not used for synchronization. As described herein, if the primary database 410-a, the secondary database 410-b, or both lose network connectivity, the transactions applied to the primary database 410-a during the time in which connectivity was lost may be captured via backups obtained by the CDM service 420 and applied to the secondary database 410-b to maintain synchronization.

After enabling the data synchronization between the primary database 410-a and the secondary database 410-b, the metadata scan and orchestration services 415 may perform a metadata scan 440 of the primary database 410-a and the secondary database 410-*b*. The metadata scan and orchestration services 415 may perform the metadata scan 440 periodically or semi-statically to obtain metadata indicative of a current replication status of the databases 410. The metadata may include one or more replication metrics indicative of the current replication status of the databases 410, such as a timing (e.g., replication lags) associated with replication between the primary database 410-*a* and the secondary database 410-*b*, a severity of errors associated with the replication, a mode of the replication, or any combination thereof. The replication status of the databases 410 may indicate a state of synchronization between the primary database 410-*a* and the secondary database 410-*b*, may indicate potential issues or errors associated with the synchronization, or both (e.g., a health check).

In some examples, the metadata scan and orchestration services 415 may display the replication metrics to a DBA 435 via an interface 430 (e.g., a user interface, such as a computer, a tablet, a smartphone, a web browser, or the like) after performing the metadata scan 440. The metadata scan and orchestration services 415 may display the replication metrics periodically, semi-statically, in response to an input signal received via the interface 430 (e.g., from the DBA 435), or any combination thereof. For example, the DBA 435 may request the replication metrics, and the metadata scan and orchestration services 415 may display the replication metrics via the interface 430 in response to the request from the DBA 435. In some other examples, the metadata scan and orchestration services 415 may refrain from displaying the replication metrics via the interface 430.

If the replication metrics are indicative of an error or issue with the replication and synchronization of data between the primary database 410-*a* and the secondary database 410-*b*, the metadata scan and orchestration services 415 may initiate a self-heal process (e.g., a log synchronization service) as described herein to re-synchronize the secondary database 410-*b* with the primary database 410-*a*. In some examples, the metadata scan and orchestration services 415 may determine to initiate the self-heal process based on a value of the one or more replication metrics and one or more threshold values. For example, a value may be assigned to each of the one or more replication metrics. If a value of any one of the replication metrics, values of a subset of the replication metrics, or values of all of the replication metrics exceed one or more respective threshold values, the metadata scan and orchestration services 415 may initiate the self-heal process. The threshold value(s) may be configured by the metadata scan and orchestration services 415 or may be set by the DBA 435 via the interface 430. In one example, a value indicative of a replication lag between the primary database 410-*a* and the secondary database 410-*b* may be greater than a threshold value (e.g., a threshold duration of time), and the metadata scan and orchestration services 415 may initiate the self-heal process accordingly to reduce or mitigate the lag.

In some other examples, the DBA 435 may determine whether to initiate the self-heal process based on the replication metrics as displayed via the interface 430. The DBA 435 may indicate, to the metadata scan and orchestration services 415 via the interface 430, that a self-heal process should be initiated. The metadata scan and orchestration services 415 may initiate the self-heal process in response to the input signal received from the DBA 435 via the interface 430. Additionally or alternatively, the DBA 435 may indicate, to the metadata scan and orchestration services 415 via the interface 430, that the self-heal process should not be initiated. For example, the replication metrics may indicate that the primary and secondary databases 410 are synchronized, or that there are relatively few differences between the databases 410, and the DBA 435 may determine not to initiate the self-heal process accordingly. In such cases, the metadata scan and orchestration services 415 may support continued replication of data directly between the primary database 410-*a* and the secondary database 410-*b* based on the input signal received from the DBA 435 indicating not to initiate the self-heal process.

To perform the self-heal process, the metadata scan and orchestration services 415 may obtain a backup of transactions applied to the primary database 410-*a*. The metadata scan and orchestration services 415 may instruct the CDM service 420 to initiate a backup process (e.g., an archive log backup procedure) for transaction logs associated with the primary database 410-*a* at a second point in time. In some examples, the CDM service 420 may have previously obtained backups of the transaction logs associated with the primary database 410-*a* at previous times. In such cases, the CDM service 420 may utilize a most recent backup of the transaction logs, or the CDM service 420 may obtain an incremental backup of the transaction logs at the second point in time. Additionally or alternatively, the CDM service 420 may acquire a first full backup of the transaction logs at the second point in time in response to the instructions from the metadata scan and orchestration services 415. The metadata scan and orchestration services 415 may obtain the backup of the transaction logs from the CDM services 420.

The metadata scan and orchestration services 415 may validate the secondary host server 405-*b* and clean up any other mounts that may currently exist on the secondary host server 405-*b*. For example, the metadata scan and orchestration services 415 may remove one or more first mounts 425 of one or more transaction files from the secondary server 405-*b*. The one or more first mounts 425 may correspond to previous transaction files associated with the primary database 410-*a*, other files associated with other databases 410, or both. The metadata scan and orchestration services 415 may clean up the secondary server 405-*b* prior to obtaining the backup of the transaction logs or after obtaining the backup of the transaction logs associated with the primary database 410-*a*.

After obtaining the backup of the transaction logs and removing previous mounts 425 from the secondary server 405-*b*, the metadata scan and orchestration services 415 may mount the transaction logs associated with the primary database 410-*a* to the secondary server 405-*b* based on the backup of the transaction logs. Mounting the transaction logs may include processing transaction files within the transaction logs and presenting the transaction files to be stored on the secondary server 405-*b* in the form of the log mount 425-*a*. Once mounted on the secondary server 405-*b*, the transaction files may be accessible to the secondary server 405-*b* and the secondary database 410-*b* hosted by the secondary server 405-*b*. The log mount 425-*a* may include a replication of the transaction files associated with the primary database 410-*a* at the second point in time.

After mounting the transaction logs to the secondary server 405-*b*, the metadata scan and orchestration services 415 may restore the transaction (e.g., archive) logs to the secondary database 410-*b* from the log mount 425-*a*. The metadata scan and orchestration services 415 may apply one or more transactions to the secondary database 410-*b* based on the transaction logs. The one or more transactions may correspond to transactions applied to the primary database 410-*a* that were not previously synchronized or replicated to the secondary database 410-*b* (e.g., due to connectivity issues in the network, database corruption, or both). As such, the metadata scan and orchestration services 415 may utilize backups of the primary database 410-*a* obtained by the CDM service 420 (e.g., or some other data backup service) to facilitate reliable synchronization between the primary database 410-*a* and the secondary database 410-*b* irrespective of database corruption or loss of network connection.

In some examples, the described techniques may be applied to more than one secondary database, more than one primary database, or both within a data management system 400. Additionally or alternatively, the roles of the primary database 410-*a* and the secondary database 410-*b* may be reversed at any point in time, and the described techniques for setup and synchronization may still apply.

The metadata scan and orchestration services 415 may thereby facilitate efficient setup of a secondary database 410-*b* that may operate as a standby or backup database for a primary database 410-*a* during maintenance procedures or other disaster recovery scenarios. The metadata scan and orchestration services 415 may additionally or alternatively perform a metadata scan to detect whether replication issues are present between the first and second databases 410 and determine whether to initiate a re-synchronization procedure. The metadata scan and orchestration services 415 may facilitate reliable and near-continuous (e.g., uninterrupted or unbroken) synchronization between the primary database 410-*a* and the secondary database 410-*b* by transferring backed up transaction logs between databases 410.

Figure 5:
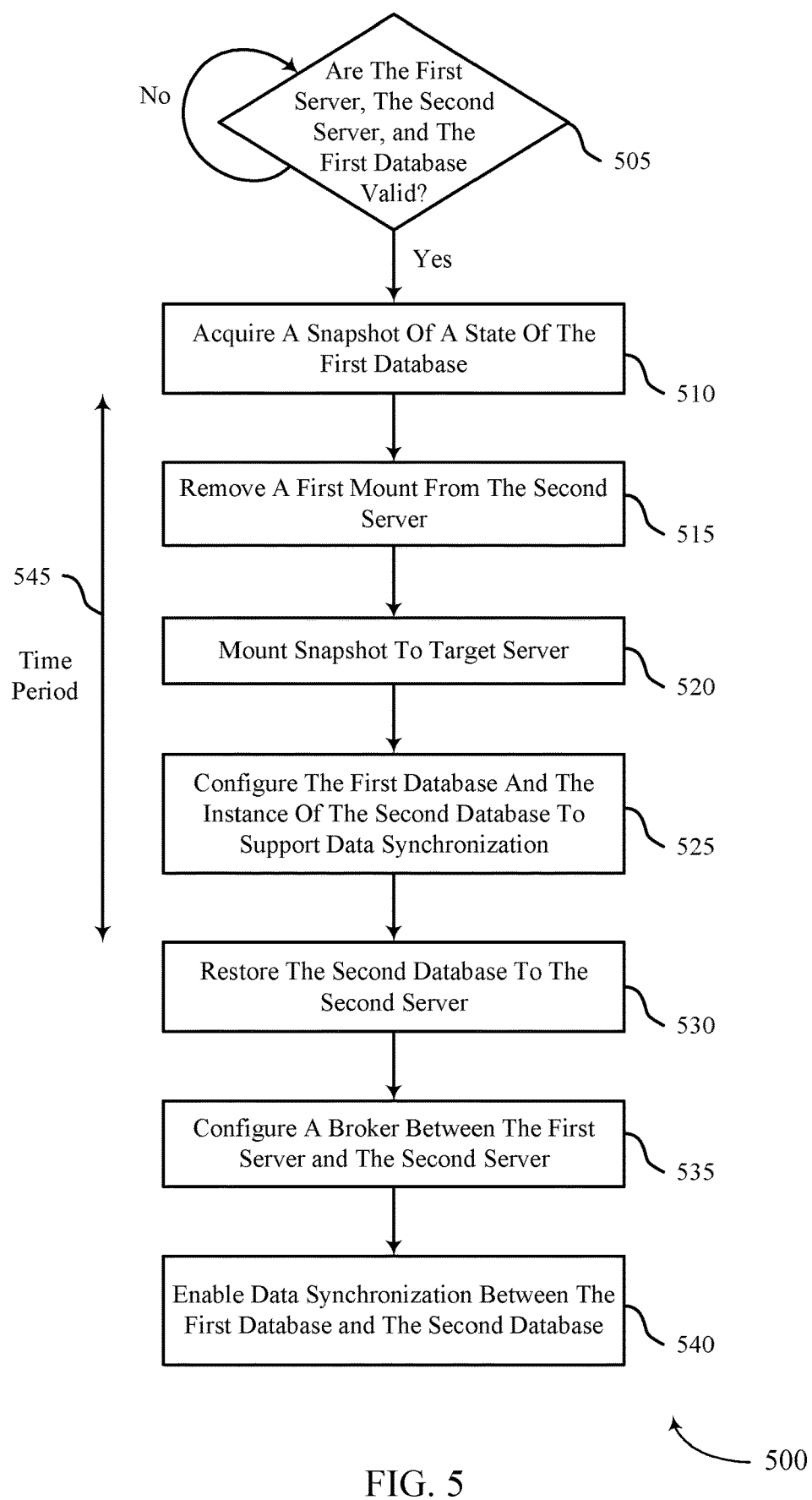
FIG. 5 illustrates an example of a process flow that supports life cycle management for standby databases in accordance with aspects of the present disclosure.

FIG. 5 illustrates an example of a process flow 500 that supports life cycle management for standby databases in accordance with aspects of the present disclosure. The process flow 500 may implement or be implemented by aspects of the data management system 400 described with reference to FIG. 4. For example, the process flow 500 may be implemented by a data backup and protection service, such as the CDM service 420, the metadata scan and orchestration services 415, or both, as described with reference to FIG. 4. The process flow 500 may describe a method for setting up or configuring a second database (e.g., a secondary, standby, or target database) within a data management system. Prior to setting up the second database, the data management system may include at least a first database (e.g., a primary or source database), a first server that hosts the first database, and a second server (e.g., a secondary, standby, or target server).

Aspects of the process flow 500 may be implemented by one or more elements or components of a data backup, protection, and replication service within a data management system. for example, aspects of the process flow 500 may be implemented by a CDM service, a metadata scan and orchestration service, or some other software configured to manage backup and replication of data between databases. Alternative examples of the following may be implemented in which some operations are performed in a different order than described or are not performed at all. In some cases, operations may include features not mentioned below, or additional operations may be added.

At 505, it may be determined whether the first server, the second server, the first database, or any combination thereof are valid. Determining validity of the first database and the first and second servers may include verifying compatibility between the first server and the second server within the data management system. Determining the validity may additionally or alternatively include determining validity of one or more prerequisite parameters associated with the first database, the first server, the second server, or any combination thereof. The one or more prerequisite parameters may include a mode (e.g., a transaction or database replication mode), a storage capacity, a state of software (e.g., a software version), or any combination thereof associated with the first database, the first server, the second server, or any combination thereof. If any of the first server, the second server, and the first database are not valid, one or more configuration changes may be applied, and the validity may be checked again. In some examples, the validity check may be performed up to a threshold quantity of times, after which a third server may be verified for compatibility with the first server (e.g., a new target server may be identified). In some examples, the verification check may be performed by a prerequisite checks engine within a metadata scan and orchestration service, as described with reference to FIG. 4.

At 510, if the first server, the second server, and the first database are valid, a snapshot of a state of the first database may be acquired. In some examples, a data guard setup engine within a metadata scan and orchestration service may instruct a CDM service to acquire the snapshot of the state of the first database. The snapshot of the state may represent a state of database files and transaction files associated with the first database at a first point in time. The snapshot may be an incremental snapshot or a base snapshot, as described with reference to FIG. 4.

At 515, in some examples, a first mount of one or more files may be removed from the second server based on or after acquiring the snapshot of the state of the first database. For example, if a previous mount of one or more files exists on the second server, the metadata scan and orchestration services may remove the previous mount to clean up the second server.

At 520, the snapshot of the state of the first database may be mounted to the second server. For example, the metadata scan and orchestration services may process the snapshot to generate a full image of the state of the first database and may present the full image to the second server, as described with reference to FIG. 4. Once mounted on the second server, the snapshot may correspond to an instance of a second (e.g., target) database (e.g., a live mount). The snapshot may be mounted to the second server based on removing the first mount of the one or more files from the second server.

At 525, the first database and the instance of the second database may be configured to support data synchronization. The metadata scan and orchestration services may apply a first set of one or more configuration settings to the first database and a second set of one or more configuration settings to the second database. The configuration settings may be applied while data synchronization is disabled between the databases.

At 530, the second database may be restored to the second server using the instance of the second database (e.g., the live mount) based on configuring the first and second databases to support data synchronization. The second database restored to the second server may replicate the state of the first database at the first point in time.

At 535, in some examples, a broker may be configured between the first server and the second server based on or after restoring the second database to the second server. The broker may be configured to manage metadata for the data management system including the first server and the second server, as described in more detail with reference to FIG. 4.

At 540, data synchronization between the first database and the second database may be enabled. The data synchronization may be enabled in accordance with the first set of one or more configuration settings and the second set of one or more configuration settings. In some examples, the metadata scan and orchestration services may verify that a time period 545 between acquiring the snapshot of the state of the first database at 510 and restoring the second database to the second server is less than a threshold time period. That is, the metadata scan and orchestration services may verify that the snapshot of the state of the first database 510 is still valid and relatively up-to-date.

The metadata scan and orchestration services may enable the data synchronization based on the time period 545 being less than the threshold time period. If the time period 545 is greater than the threshold time period, the metadata scan and orchestration services may, in some examples, return to 510 to re-acquire a snapshot of the first database at a second point in time and perform the described setup procedure again before enabling data synchronization at 540.

Figure 6:
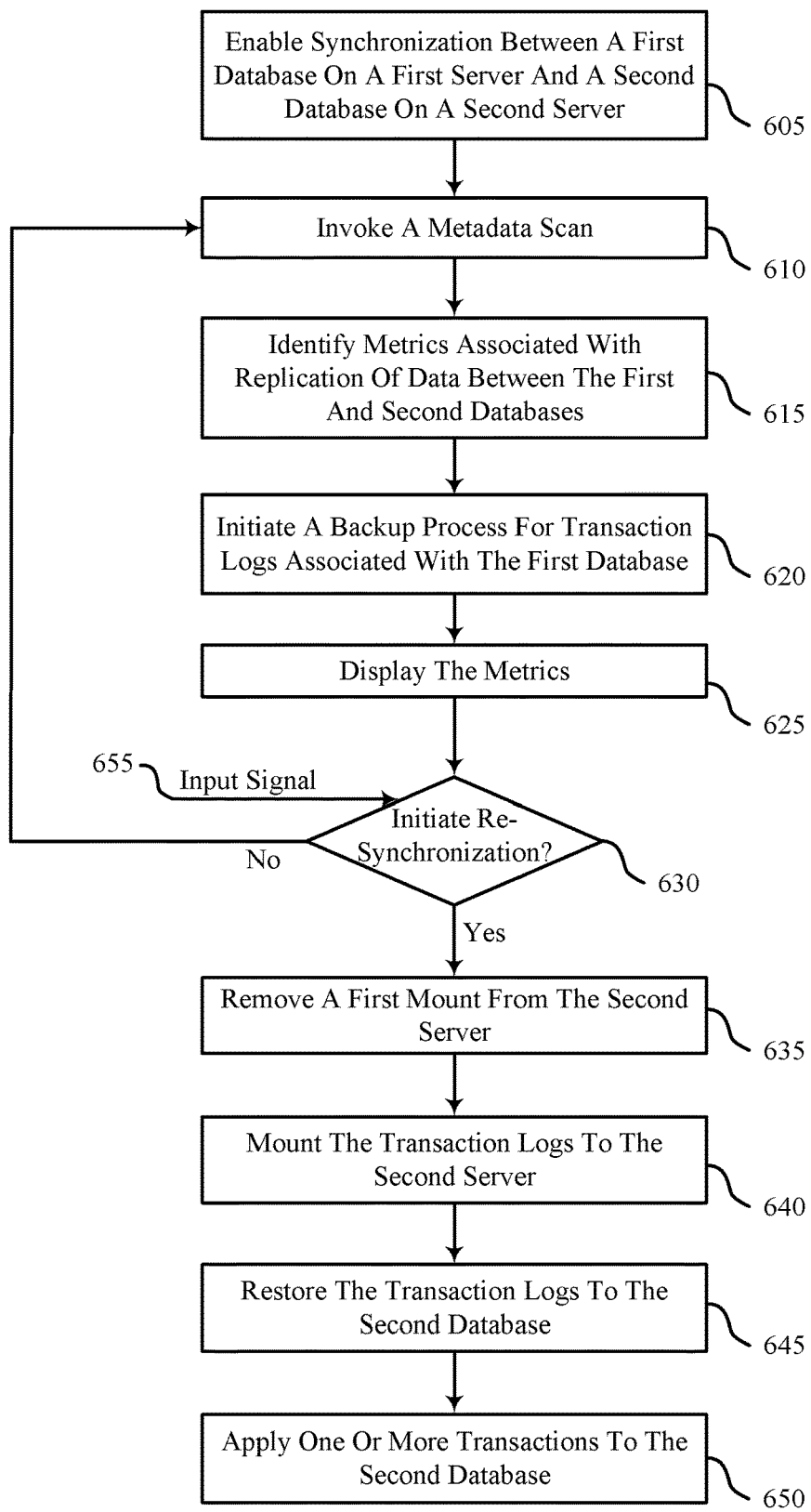
FIG. 6 illustrates an example of a process flow that supports life cycle management for standby databases in accordance with aspects of the present disclosure.

FIG. 6 illustrates an example of a process flow 600 that supports life cycle management for standby databases in accordance with aspects of the present disclosure. The process flow 600 may implement or be implemented by aspects of the data management system 400 described with reference to FIG. 4. For example, the process flow 600 may be implemented by a data backup and protection service within a data management system, such as the CDM service 420, the metadata scan and orchestration services 415, or both, as described with reference to FIG. 4. The process flow 600 may describe a method for repairing and synchronizing a second database (e.g., a secondary, standby, or target database) with a first database (e.g., a primary or source database) in a data management system.

The data management system may include at least the first database, a first server (e.g., a primary or source server) that hosts the first database, the second database, and a second server (e.g., a secondary, standby, or target server) that hosts the second database. The second database may be setup or configured on the second server according to the techniques described with reference to FIG. 5. For example, the second database may be configured to act as a standby or backup database for the first database in the data management system.

Aspects of the process flow 600 may be implemented by one or more elements or components of a data backup, protection, and replication service within a data management system. for example, aspects of the process flow 600 may be implemented by a CDM service, a metadata scan and orchestration service, or some other software configured to manage backup and replication of data between databases. Alternative examples of the following may be implemented in which some operations are performed in a different order than described or are not performed at all. In some cases, operations may include features not mentioned below, or additional operations may be added.

At 605, synchronization between the first database on the first server and the second database on the second server may be enabled, as described in further detail with reference to FIG. 5. In some examples, synchronization may be facilitated by copying or replicating data from the first database directly to the second database.

At 610, a metadata scan may be invoked for the first database and the second database. The metadata scan may represent an example of the metadata scan 440 described with reference to FIG. 4. For example, the metadata scan and orchestration services may invoke the metadata scan to obtain diagnostics and replication metrics associated with the data management system including the first and second databases.

At 615, one or more metrics associated with replication of data between the first database and the second database may be identified. The metrics may be identified based on the metadata acquired during the metadata scan. The metrics may correspond to a timing associated with replication of data between the first database and the second database, a mode of replication of data between the first database and the second database, or both.

At 620, a backup process for transaction logs (e.g., archive logs) associated with the first database may be initiated after acquiring the metadata. For example, a CDM service, such as the CDM service 420 described with reference to FIG. 4, may backup transaction logs associated with the first database at a first point in time. The backup may be initiated by the CDM periodically, semi-statically, or in response to instructions received from a metadata scan and orchestration service. In some examples, the backup may be initiated based on the replication metrics identified during the metadata scan.

At 625, in some examples, the one or more metrics may be displayed via an interface associated with the data management system including the first database and the second database. For example, the one or more metrics may be displayed to a DBA 435 or other user via an interface 430, as described with reference to FIG. 4. The metadata scan and orchestration services may display the one or more metrics periodically, semi-statically, or in response to an input signal (e.g., a request) from the DBA associated with the data management system via the interface. The metadata scan and orchestration services may display values representative of the metrics, a severity level associated with the metrics (e.g., on a scale), an indication of which metrics correspond to which database, or any combination thereof, such that the DBA may interpret the replication metrics.

At 630, it may be determined whether to initiate re-synchronization between the first database and the second database. The metadata scan and orchestration services may determine whether to initiate the re-synchronization (e.g., a self-heal operation) based on an input signal 655, based on values of the metrics, or both. In some examples, the metadata scan and orchestration services may receive an input signal 655 via the interface in response to displaying the one or more metrics. The input signal 655 may correspond to a request, by the DBA, to initiate a repair procedure (e.g., a self-heal operation) to re-synchronize the databases, repair one or both of the databases, or both. The metadata scan and orchestration services may determine to initiate the re-synchronization based on the input signal 655.

In some other examples, the metadata scan and orchestration services may determine that a value of the one or more replication metrics satisfies a threshold value. For example, the metadata scan and orchestration services may apply a value to each of the one or more metrics and compare the value for each metric with a respective threshold value. The threshold value(s) may be associated with a threshold duration of time (e.g., a threshold replication lag period), a threshold severity (e.g., a threshold amount of errors associated with the replication), or both. In such cases, if a value of one of the metrics, a subset of the metrics, or all of the metrics satisfies the respective threshold value(s), the metadata scan and orchestration services may initiate the re-synchronization between the first and second databases.

If the metadata scan and orchestration services determine to not initiate re-synchronization (e.g., if the databases are relatively in sync), synchronization directly between the first database and the second database may continue. In some examples, the metadata scan and orchestration services may return to 610 and invoke a second metadata scan to identify updated metrics associated with the data replication and synchronization.

At 635, if the metadata scan and orchestration services determine to initiate re-synchronization based on the input signal 655, the values of the metrics, or both, a first mount may be removed from the second server. For example, if there is a previous mount of one or more files on the second server, the metadata scan and orchestration services may remove (e.g., erase or delete) the mount to clean up the second server and make room for a mount of the transaction logs.

At 640, the transaction logs associated with the first database may be mounted to the second server based on the one or more metrics and removing the first mount from the second server. The transaction logs may be mounted to the second server from a CDM service that backed up the transaction logs at 620. In some examples, the backup process for the transaction logs may be initiated after it is determined to initiate the re-synchronization (not pictured in FIG. 6).

At 645, the transaction logs may be restored to the second database from the mount. At 650, one or more transactions may be applied to the second database based on the transaction logs mounted to the second server and restored to the second database. The transaction logs may be applied to the second database to bring the second database in sync with the first database. For example, after the transactions are applied to the second database, the transaction files and database files within the second database may replicate the transaction files and database files within the first database (e.g., at a point in time at which the backup process for the transaction logs was initiated). In some examples, the one or more transaction logs restored to the second database may be associated with a second state of the first database, and applying the one or more transaction logs to the second database may override one or more first transaction logs on the second database that may be associated with a first state of the first database that is prior to the second state of the first database. That is, the applied transaction logs may re-synchronize the second database with the first database.

Figure 7:
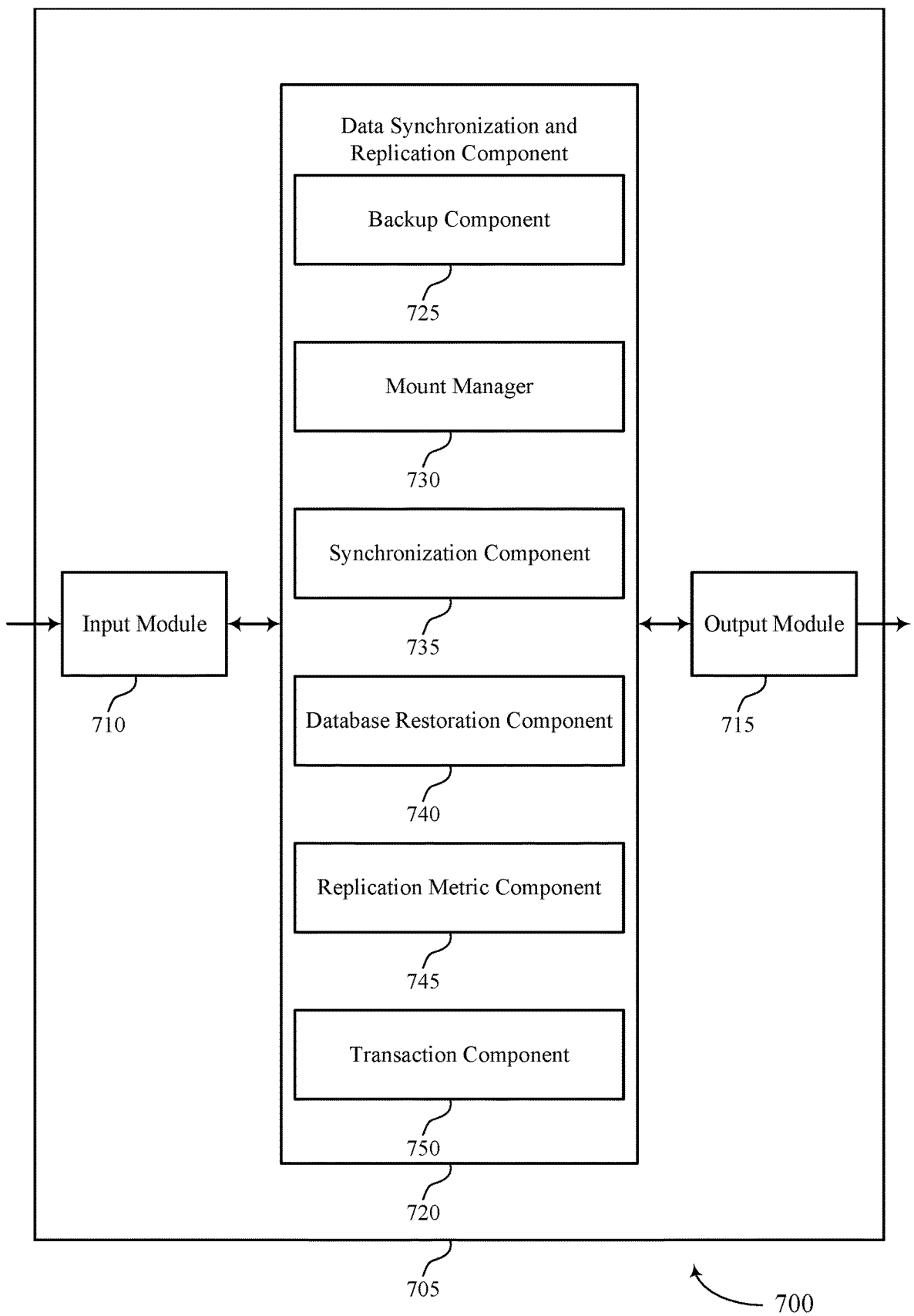
FIG. 7 shows a block diagram of an apparatus that supports life cycle management for standby databases in accordance with aspects of the present disclosure.

FIG. 7 shows a block diagram 700 of a device 705 that supports life cycle management for standby databases in accordance with aspects of the present disclosure. The device 705 may include an input module 710, an output module 715, and a data synchronization and replication component 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the data synchronization and replication component 720 to support life cycle management for standby databases. In some cases, the input module 710 may be a component of a network interface 910 as described with reference to FIG. 9.

The output module 715 may manage output signals for the device 705. For example, the output module 715 may receive signals from other components of the device 705, such as the data synchronization and replication component 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of a network interface 910 as described with reference to FIG. 9.

For example, the data synchronization and replication component 720 may include a backup component 725, a mount manager 730, a synchronization component 735, a database restoration component 740, a replication metric component 745, a transaction component 750, or any combination thereof. In some examples, the data synchronization and replication component 720, or various components thereof, may be configured to perform various operations (e.g., receiving, monitoring, transmitting) using or otherwise in cooperation with the input module 710, the output module 715, or both. For example, the data synchronization and replication component 720 may receive information from the input module 710, send information to the output module 715, or be integrated in combination with the input module 710, the output module 715, or both to receive information, transmit information, or perform various other operations as described herein. The data synchronization and replication component 720 may represent an example of a metadata scan and orchestration services 415, described with reference to FIG. 4, or some other application or service running on a storage appliance 110, a storage appliance 135, or a storage appliance 300, as described with reference to FIGS. 1 and 3.

The data synchronization and replication component 720 may support data or database management in accordance with examples as disclosed herein. The backup component 725 may be configured as or otherwise support a means for acquiring a snapshot of a state of a first database hosted by a first server. The mount manager 730 may be configured as or otherwise support a means for mounting the snapshot of the state of the first database to a second server, wherein, once mounted on the second server, the snapshot corresponds to an instance of a second database. The synchronization component 735 may be configured as or otherwise support a means for configuring the first database and the instance of the second database to support data synchronization between the first database and the second database. The database restoration component 740 may be configured as or otherwise support a means for restoring, using the instance of the second database, the second database to the second server based at least in part on configuring the first database and the instance of the second database to support the data synchronization, wherein the second database replicates the state of the first database. The synchronization component 735 may be configured as or otherwise support a means for enabling the data synchronization between the first database and the second database after restoring the second database.

Additionally or alternatively, the data synchronization and replication component 720 may support data or database management in accordance with additional examples as disclosed herein. The synchronization component 735 may be configured as or otherwise support a means for enabling synchronization between a first database on a first server and a second database on a second server. The replication metric component 745 may be configured as or otherwise support a means for identifying one or more metrics associated with replication of data between the first database and the second database. The backup component 725 may be configured as or otherwise support a means for initiating a backup process for transaction logs associated with the first database after identifying the one or more metrics. The mount manager 730 may be configured as or otherwise support a means for mounting, to the second server and based at least in part on the one or more metrics, one or more of the transaction logs associated with the first database. The transaction component 750 may be configured as or otherwise support a means for applying, to the second database, one or more transactions based at least in part on the one or more transaction logs mounted to the second server.

Figure 8:
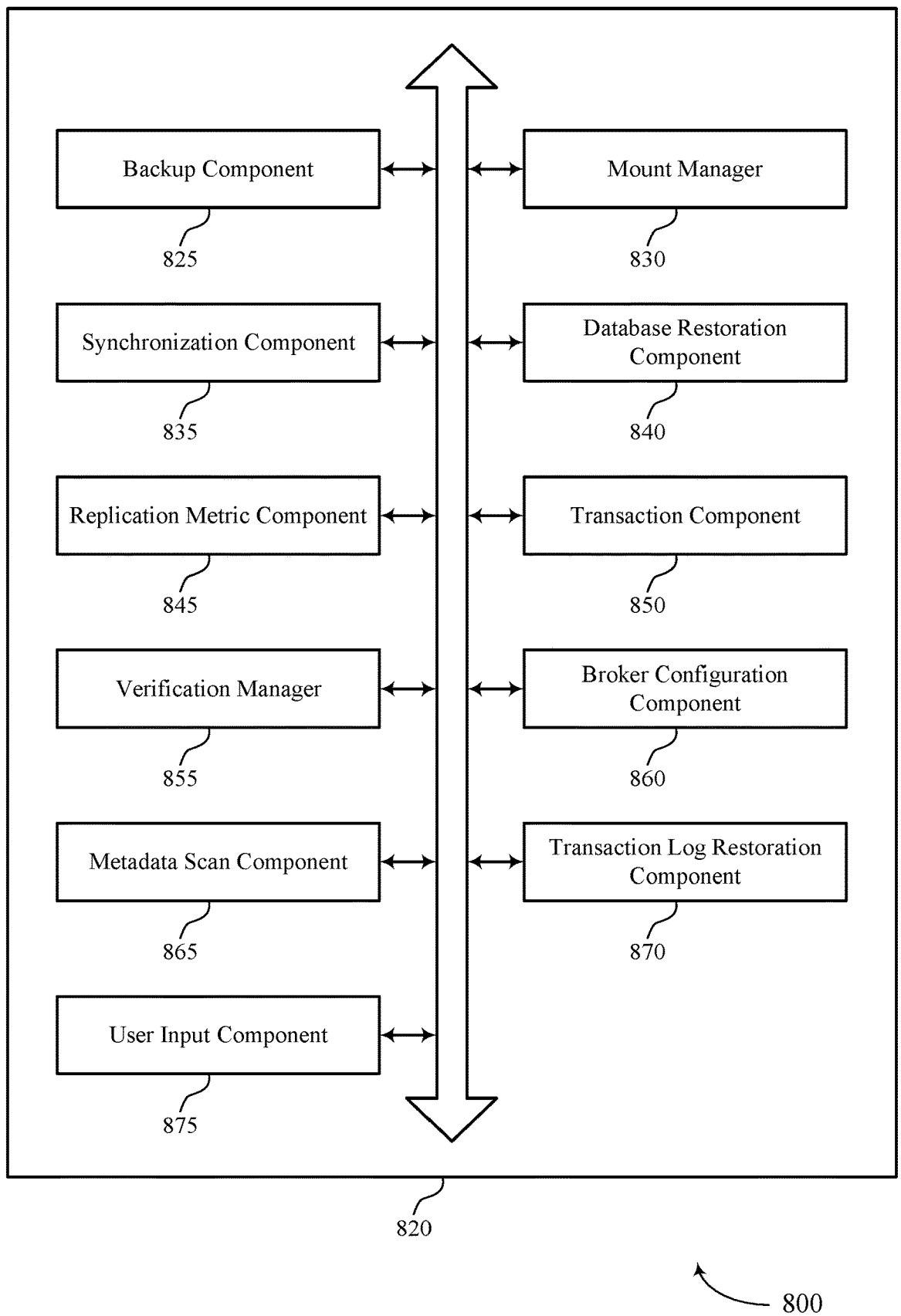
FIG. 8 shows a block diagram of a data synchronization and replication component that supports life cycle management for standby databases in accordance with aspects of the present disclosure.

FIG. 8 shows a block diagram 800 of a data synchronization and replication component 820 that supports life cycle management for standby databases in accordance with aspects of the present disclosure. The data synchronization and replication component 820 may be an example of aspects of a data synchronization and replication component or a data synchronization and replication component 720, or both, as described herein. The data synchronization and replication component 820, or various components thereof, may be an example of means for performing various aspects of life cycle management for standby databases as described herein. For example, the data synchronization and replication component 820 may include a backup component 825, a mount manager 830, a synchronization component 835, a database restoration component 840, a replication metric component 845, a transaction component 850, a verification manager 855, a broker configuration component 860, a metadata scan component 865, a transaction log restoration component 870, a user input component 875, or any combination thereof. Each of these components may communicate, directly or indirectly, with one another (e.g., via one or more buses).

The data synchronization and replication component 820 may support data or database management in accordance with examples as disclosed herein. The backup component 825 may be configured as or otherwise support a means for acquiring a snapshot of a state of a first database hosted by a first server. The mount manager 830 may be configured as or otherwise support a means for mounting the snapshot of the state of the first database to a second server, wherein, once mounted on the second server, the snapshot corresponds to an instance of a second database. The synchronization component 835 may be configured as or otherwise support a means for configuring the first database and the instance of the second database to support data synchronization between the first database and the second database. The database restoration component 840 may be configured as or otherwise support a means for restoring, using the instance of the second database, the second database to the second server based at least in part on configuring the first database and the instance of the second database to support the data synchronization, wherein the second database replicates the state of the first database. In some examples, the synchronization component 835 may be configured as or otherwise support a means for enabling the data synchronization between the first database and the second database after restoring the second database.

In some examples, the verification manager 855 may be configured as or otherwise support a means for verifying compatibility between the first server and the second server within a data management system, wherein acquiring the snapshot of the state of the first database is based at least in part on verifying the compatibility between the first server and the second server.

In some examples, the verification manager 855 may be configured as or otherwise support a means for verifying one or more prerequisite parameters associated with the first database, the first server, the second server, or any combination thereof, wherein acquiring the snapshot of the state of the first database is based at least in part on verifying the one or more prerequisite parameters associated with the first database, the first server, the second server, or any combination thereof. In some examples, the one or more prerequisite parameters comprise a mode, a storage capacity, a state of software, or any combination thereof associated with the first database, the first server, the second server, or any combination thereof.

In some examples, to support mounting the snapshot of the state of the first database to the second server, the mount manager 830 may be configured as or otherwise support a means for removing, based at least in part on acquiring the snapshot of the state of the first database, a first mount of one or more files from the second server. In some examples, to support mounting the snapshot of the state of the first database to the second server, the mount manager 830 may be configured as or otherwise support a means for mounting the snapshot of the state of the second database to the second server after removing the first mount of the one or more files from the second server.

In some examples, the broker configuration component 860 may be configured as or otherwise support a means for configuring, after restoring the second database to the second server, a broker between the first server and the second server, wherein the broker is configured to manage metadata for a data management system comprising the first server and the second server.

In some examples, to support configuring the first database and the instance of the second database to support the data synchronization, the synchronization component 835 may be configured as or otherwise support a means for applying a first set of one or more configuration settings to the first database. In some examples, to support configuring the first database and the instance of the second database to support the data synchronization, the synchronization component 835 may be configured as or otherwise support a means for applying a second set of one or more configuration settings to the second database, wherein the first and second sets of one or more configuration settings are applied while the data synchronization is disabled.

In some examples, to support enabling the data synchronization between the first database and the second database, the synchronization component 835 may be configured as or otherwise support a means for enabling the data synchronization between the first database and the second database in accordance with the first set of one or more configuration settings and the second set of one or more configuration settings.

In some examples, to support enabling the data synchronization between the first database and the second database, the verification manager 855 may be configured as or otherwise support a means for verifying that a time period between acquiring the snapshot of the state of the first database and restoring the instance of the second database to the second server is less than a threshold time period. In some examples, to support enabling the data synchronization between the first database and the second database, the synchronization component 835 may be configured as or otherwise support a means for enabling the data synchronization between the first database and the second database based at least in part on verifying that the time period is less than the threshold time period.

Additionally or alternatively, the data synchronization and replication component 820 may support data or database management in accordance with additional examples as disclosed herein. In some examples, the synchronization component 835 may be configured as or otherwise support a means for enabling synchronization between a first database on a first server and a second database on a second server. The replication metric component 845 may be configured as or otherwise support a means for identifying one or more metrics associated with replication of data between the first database and the second database. In some examples, the backup component 825 may be configured as or otherwise support a means for initiating a backup process for transaction logs associated with the first database after identifying the one or more metrics. In some examples, the mount manager 830 may be configured as or otherwise support a means for mounting, to the second server and based at least in part on the one or more metrics, one or more of the transaction logs associated with the first database. The transaction component 850 may be configured as or otherwise support a means for applying, to the second database, one or more transactions based at least in part on the one or more transaction logs mounted to the second server.

In some examples, to support identifying the one or more metrics associated with replication of data between the first database and the second database, the metadata scan component 865 may be configured as or otherwise support a means for acquiring metadata associated with the first database and the second database. In some examples, to support identifying the one or more metrics associated with replication of data between the first database and the second database, the replication metric component 845 may be configured as or otherwise support a means for identifying the one or more metrics associated with replication of data between the first database and the second database based at least in part on the acquired metadata.

In some examples, the replication metric component 845 may be configured as or otherwise support a means for displaying the one or more metrics associated with replication of data between the first database and the second database via an interface associated with a data management system comprising the first database and the second database. In some examples, to support displaying the one or more metrics associated with replication of data between the first database and the second database via the interface, the replication metric component 845 may be configured as or otherwise support a means for displaying the one or more metrics periodically, or semi-statically, or in response to an input signal from a DBA associated with the data management system, or any combination thereof.

In some examples, the user input component 875 may be configured as or otherwise support a means for receiving, via the interface, an input signal in response to displaying the one or more metrics, wherein mounting the one or more transaction logs associated with the first database to the second server is based at least in part on the input signal.

In some examples, to support mounting the one or more transaction logs associated with the first database to the second server, the replication metric component 845 may be configured as or otherwise support a means for determining that a value of the one or more metrics associated with replication of data between the first database and the second database satisfies a threshold value. In some examples, to support mounting the one or more transaction logs associated with the first database to the second server, the mount manager 830 may be configured as or otherwise support a means for mounting the one or more transaction logs associated with the first database to the second server based at least in part on determining that the value of the one or more metrics satisfies the threshold value, wherein the threshold value is associated with a threshold duration of time, a threshold severity, or both.

In some examples, to support mounting the one or more transaction logs associated with the first database to the second server, the mount manager 830 may be configured as or otherwise support a means for removing, based at least in part on identifying the one or more metrics associated with replication of data between the first database and the second database, a first mount of one or more files from the second server. In some examples, to support mounting the one or more transaction logs associated with the first database to the second server, the mount manager 830 may be configured as or otherwise support a means for mounting the one or more transaction logs associated with the first database to the second server based at least in part on removing the first mount of the one or more files from the second server.

In some examples, to support applying the one or more transactions to the second database, the transaction log restoration component 870 may be configured as or otherwise support a means for restoring the one or more transaction logs to the second database. In some examples, to support applying the one or more transactions to the second database, the transaction component 850 may be configured as or otherwise support a means for applying, to the second database, the one or more transactions based at least in part on the one or more transaction logs restored to the second database. In some examples, the one or more transaction logs restored to the second database are associated with a second state of the first database, the second state of the first database subsequent to a first state of the first database. In some examples, the one or more transaction logs, once applied to the second database, override one or more first transaction logs associated with the first state of the first database.

In some examples, the one or more metrics correspond to a timing associated with replication of data between the first database and the second database, a mode of replication of data between the first database and the second database, or both.

Figure 9:
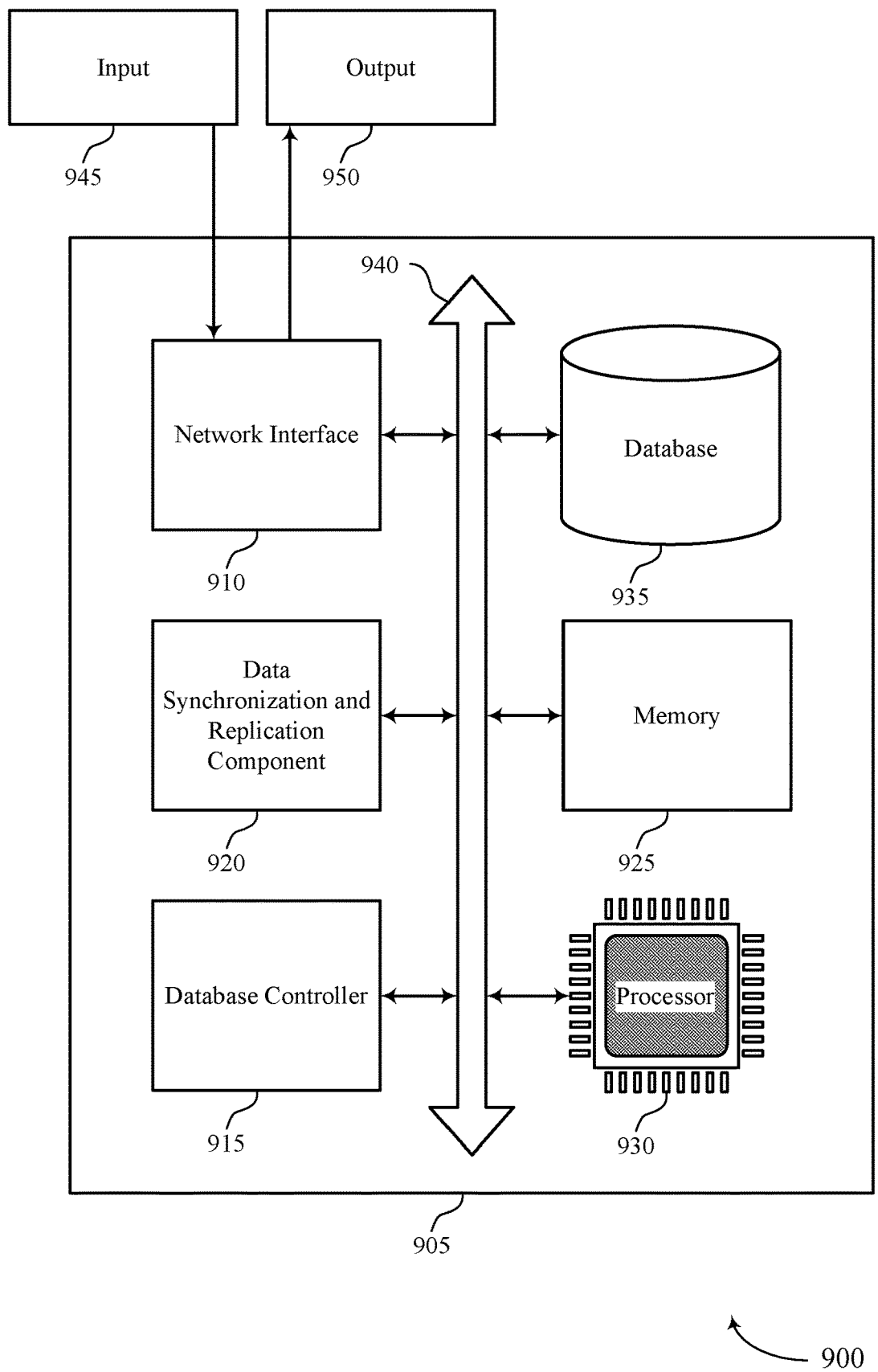
FIG. 9 shows a diagram of a system including a device that supports life cycle management for standby databases in accordance with aspects of the present disclosure.

FIG. 9 shows a diagram of a system 900 including a device 905 that supports life cycle management for standby databases in accordance with aspects of the present disclosure. The device 905 may be an example of or include the components of a device 705 as described herein. The device 905 may include components for bi-directional data communications including components for transmitting and receiving communications, such as a data synchronization and replication component 920, a network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940). The data synchronization and replication component 920 may in some cases be an example of a data synchronization and replication component 720 as described herein or aspects thereof.

The network interface 910 may manage input signals 945 and output signals 950 for the device 905. The network interface 910 may also manage peripherals not integrated into the device 905. In some cases, the network interface 910 may represent a physical connection or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting life cycle management for standby databases).

For example, the data synchronization and replication component 920 may be configured as or otherwise support a means for acquiring a snapshot of a state of a first database hosted by a first server. The data synchronization and replication component 920 may be configured as or otherwise support a means for mounting the snapshot of the state of the first database to a second server, wherein, once mounted on the second server, the snapshot corresponds to an instance of a second database. The data synchronization and replication component 920 may be configured as or otherwise support a means for configuring the first database and the instance of the second database to support data synchronization between the first database and the second database. The data synchronization and replication component 920 may be configured as or otherwise support a means for restoring, using the instance of the second database, the second database to the second server based at least in part on configuring the first database and the instance of the second database to support the data synchronization, wherein the second database replicates the state of the first database. The data synchronization and replication component 920 may be configured as or otherwise support a means for enabling the data synchronization between the first database and the second database after restoring the second database.

Additionally or alternatively, the data synchronization and replication component 920 may be configured as or otherwise support a means for enabling synchronization between a first database on a first server and a second database on a second server. The data synchronization and replication component 920 may be configured as or otherwise support a means for identifying one or more metrics associated with replication of data between the first database and the second database. The data synchronization and replication component 920 may be configured as or otherwise support a means for initiating a backup process for transaction logs associated with the first database after identifying the one or more metrics. The data synchronization and replication component 920 may be configured as or otherwise support a means for mounting, to the second server and based at least in part on the one or more metrics, one or more of the transaction logs associated with the first database. The data synchronization and replication component 920 may be configured as or otherwise support a means for applying, to the second database, one or more transactions based at least in part on the one or more transaction logs mounted to the second server.

By including or configuring the data synchronization and replication component 920 in accordance with examples as described herein, the device 905 may support techniques for improved reliability, reduced latency, improved user experience related to reduced processing, reduced power consumption, efficient utilization of computing resources, and reduced processing and complexity associated with setting up a secondary database and enabling data synchronization.

Figure 10:
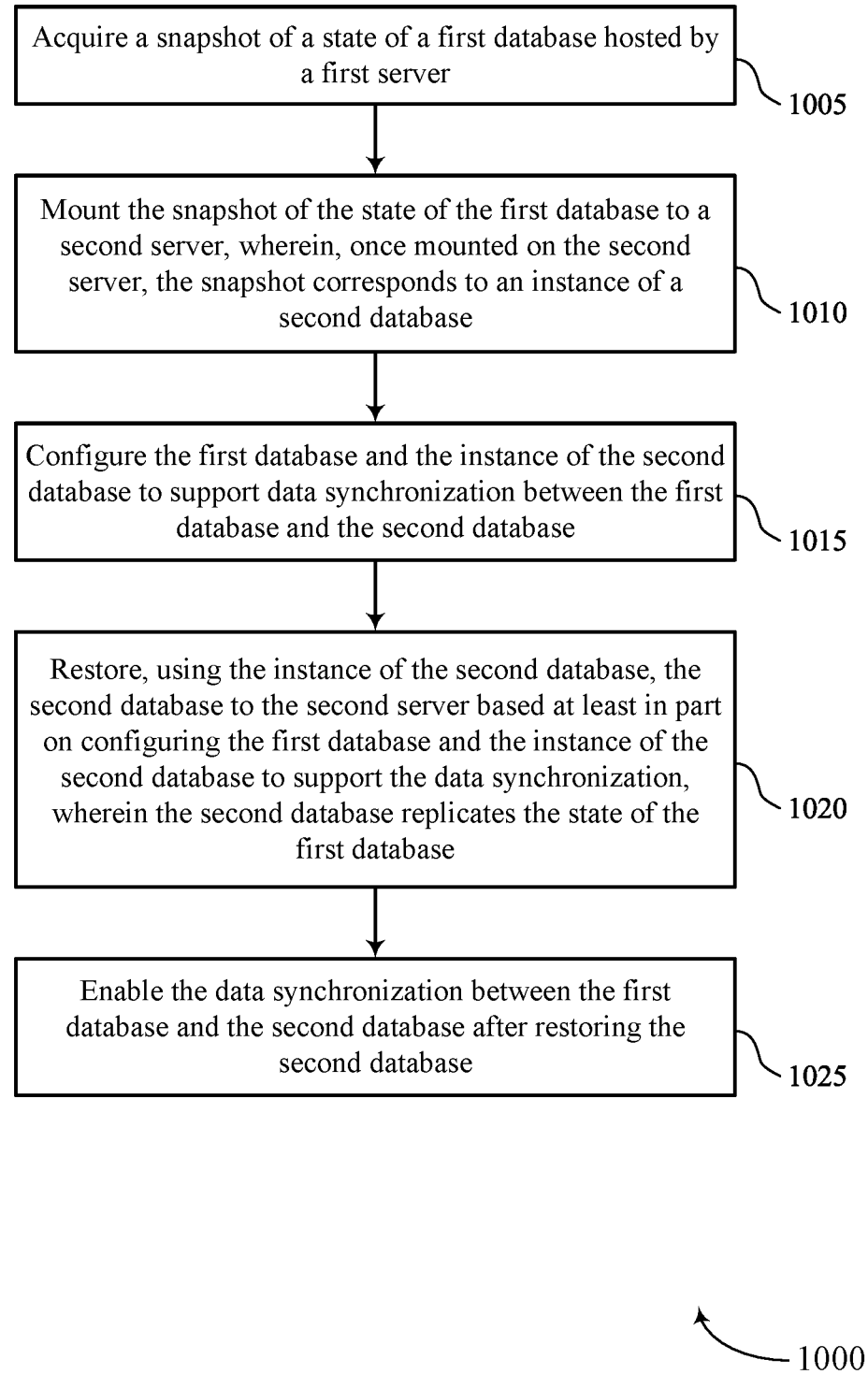
FIGS. 10 through 14 show flowcharts illustrating methods that support life cycle management for standby databases in accordance with aspects of the present disclosure.

FIG. 10 shows a flowchart illustrating a method 1000 that supports life cycle management for standby databases in accordance with aspects of the present disclosure. The operations of the method 1000 may be implemented by a data management system or its components as described herein. For example, the operations of the method 1000 may be performed by a data management system as described with reference to FIGS. 1 through 9. In some examples, a data management system may execute a set of instructions to control the functional elements of the data management system to perform the described functions. Additionally or alternatively, the data management system may perform aspects of the described functions using special-purpose hardware.

At 1005, the method may include acquiring a snapshot of a state of a first database hosted by a first server. The operations of 1005 may be performed in accordance with examples as disclosed herein. In some examples, aspects of the operations of 1005 may be performed by a backup component 825 as described with reference to FIG. 8.

At 1010, the method may include mounting the snapshot of the state of the first database to a second server, wherein, once mounted on the second server, the snapshot corresponds to an instance of a second database. The operations of 1010 may be performed in accordance with examples as disclosed herein. In some examples, aspects of the operations of 1010 may be performed by a mount manager 830 as described with reference to FIG. 8.

At 1015, the method may include configuring the first database and the instance of the second database to support data synchronization between the first database and the second database. The operations of 1015 may be performed in accordance with examples as disclosed herein. In some examples, aspects of the operations of 1015 may be performed by a synchronization component 835 as described with reference to FIG. 8.

At 1020, the method may include restoring, using the instance of the second database, the second database to the second server based at least in part on configuring the first database and the instance of the second database to support the data synchronization, wherein the second database replicates the state of the first database. The operations of 1020 may be performed in accordance with examples as disclosed herein. In some examples, aspects of the operations of 1020 may be performed by a database restoration component 840 as described with reference to FIG. 8.

At 1025, the method may include enabling the data synchronization between the first database and the second database after restoring the second database. The operations of 1025 may be performed in accordance with examples as disclosed herein. In some examples, aspects of the operations of 1025 may be performed by a synchronization component 835 as described with reference to FIG. 8.

Figure 11:
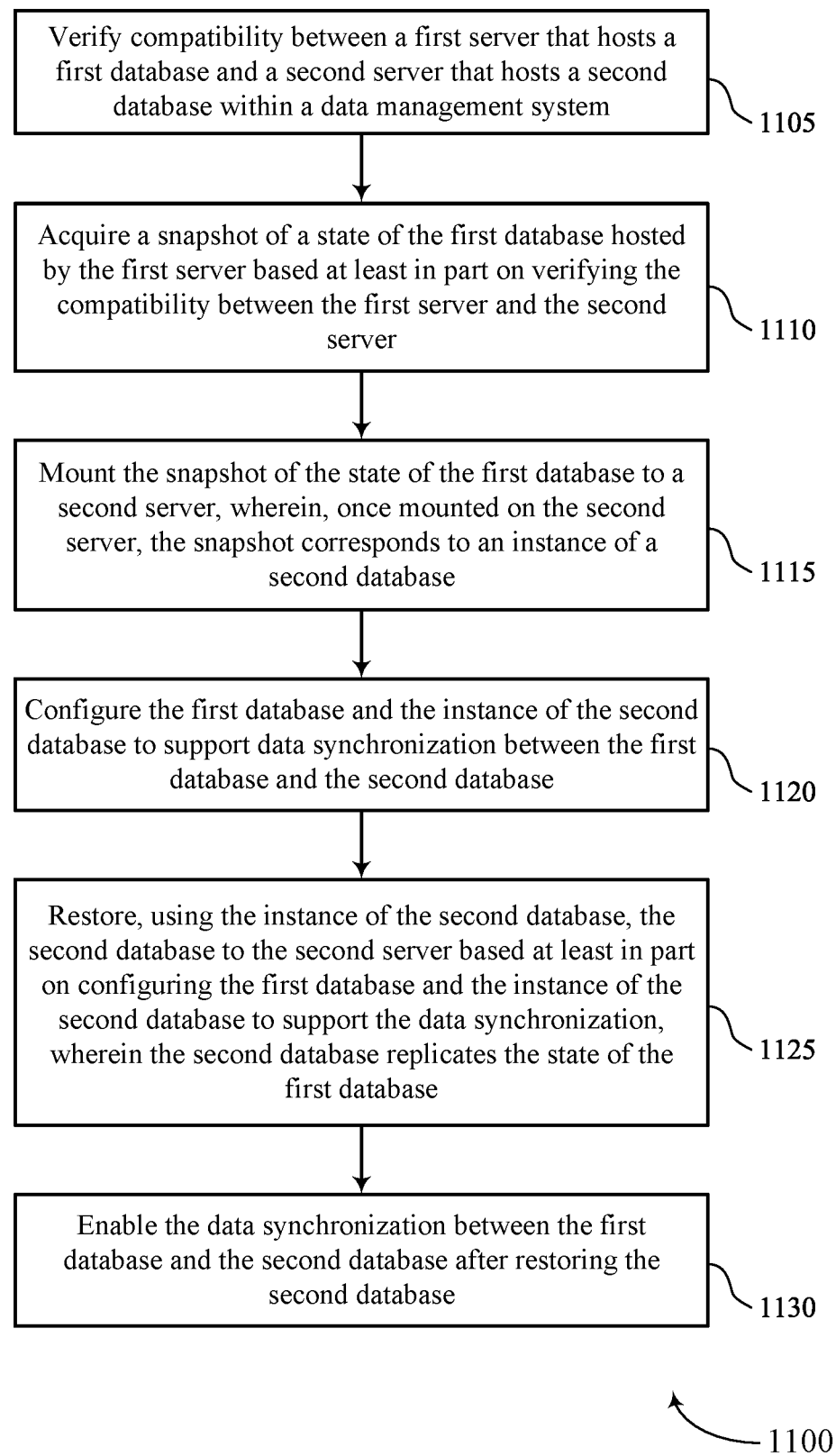

FIG. 11 shows a flowchart illustrating a method 1100 that supports life cycle management for standby databases in accordance with aspects of the present disclosure. The operations of the method 1100 may be implemented by a data management system or its components as described herein. For example, the operations of the method 1100 may be performed by a data management system as described with reference to FIGS. 1 through 9. In some examples, a data management system may execute a set of instructions to control the functional elements of the data management system to perform the described functions. Additionally or alternatively, the data management system may perform aspects of the described functions using special-purpose hardware.

At 1105, the method may include verifying compatibility between a first server that hosts a first database and a second server that hosts a second database within a data management system. The operations of 1105 may be performed in accordance with examples as disclosed herein. In some examples, aspects of the operations of 1105 may be performed by a verification manager 855 as described with reference to FIG. 8.

At 1110, the method may include acquiring a snapshot of a state of the first database hosted by the first server based at least in part on verifying the compatibility between the first server and the second server. The operations of 1110 may be performed in accordance with examples as disclosed herein. In some examples, aspects of the operations of 1110 may be performed by a backup component 825 as described with reference to FIG. 8.

At 1115, the method may include mounting the snapshot of the state of the first database to a second server, wherein, once mounted on the second server, the snapshot corresponds to an instance of a second database. The operations of 1115 may be performed in accordance with examples as disclosed herein. In some examples, aspects of the operations of 1115 may be performed by a mount manager 830 as described with reference to FIG. 8.

At 1120, the method may include configuring the first database and the instance of the second database to support data synchronization between the first database and the second database. The operations of 1120 may be performed in accordance with examples as disclosed herein. In some examples, aspects of the operations of 1120 may be performed by a synchronization component 835 as described with reference to FIG. 8.

At 1125, the method may include restoring, using the instance of the second database, the second database to the second server based at least in part on configuring the first database and the instance of the second database to support the data synchronization, wherein the second database replicates the state of the first database. The operations of 1125 may be performed in accordance with examples as disclosed herein. In some examples, aspects of the operations of 1125 may be performed by a database restoration component 840 as described with reference to FIG. 8.

At 1130, the method may include enabling the data synchronization between the first database and the second database after restoring the second database. The operations of 1130 may be performed in accordance with examples as disclosed herein. In some examples, aspects of the operations of 1130 may be performed by a synchronization component 835 as described with reference to FIG. 8.

Figure 12:
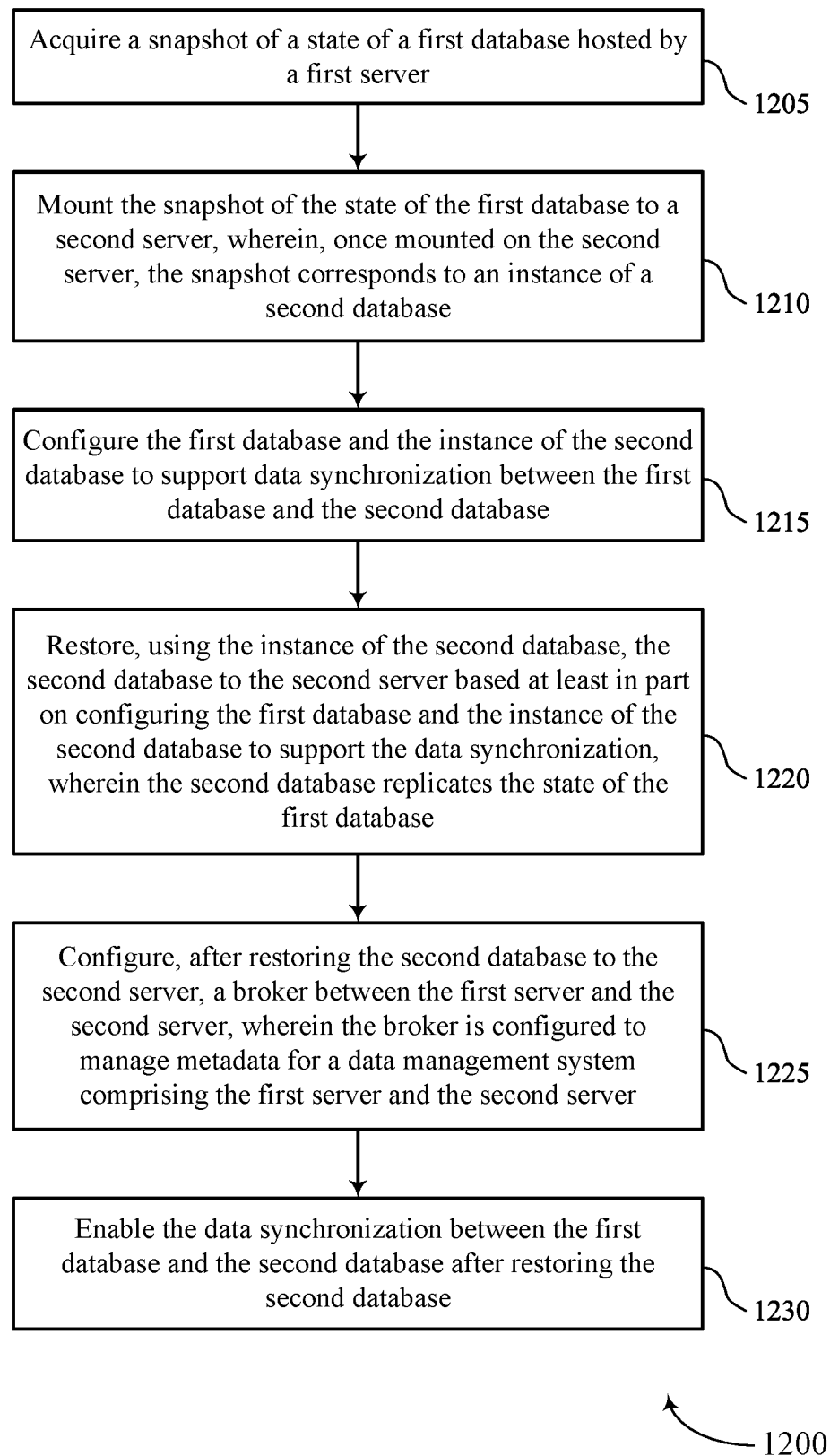

FIG. 12 shows a flowchart illustrating a method 1200 that supports life cycle management for standby databases in accordance with aspects of the present disclosure. The operations of the method 1200 may be implemented by a data management system or its components as described herein. For example, the operations of the method 1200 may be performed by a data management system as described with reference to FIGS. 1 through 9. In some examples, a data management system may execute a set of instructions to control the functional elements of the data management system to perform the described functions. Additionally or alternatively, the data management system may perform aspects of the described functions using special-purpose hardware.

At 1205, the method may include acquiring a snapshot of a state of a first database hosted by a first server. The operations of 1205 may be performed in accordance with examples as disclosed herein. In some examples, aspects of the operations of 1205 may be performed by a backup component 825 as described with reference to FIG. 8.

At 1210, the method may include mounting the snapshot of the state of the first database to a second server, wherein, once mounted on the second server, the snapshot corresponds to an instance of a second database. The operations of 1210 may be performed in accordance with examples as disclosed herein. In some examples, aspects of the operations of 1210 may be performed by a mount manager 830 as described with reference to FIG. 8.

At 1215, the method may include configuring the first database and the instance of the second database to support data synchronization between the first database and the second database. The operations of 1215 may be performed in accordance with examples as disclosed herein. In some examples, aspects of the operations of 1215 may be performed by a synchronization component 835 as described with reference to FIG. 8.

At 1220, the method may include restoring, using the instance of the second database, the second database to the second server based at least in part on configuring the first database and the instance of the second database to support the data synchronization, wherein the second database replicates the state of the first database. The operations of 1220 may be performed in accordance with examples as disclosed herein. In some examples, aspects of the operations of 1220 may be performed by a database restoration component 840 as described with reference to FIG. 8.

At 1225, the method may include configuring, after restoring the second database to the second server, a broker between the first server and the second server, wherein the broker is configured to manage metadata for the data management system comprising the first server and the second server. The operations of 1225 may be performed in accordance with examples as disclosed herein. In some examples, aspects of the operations of 1225 may be performed by a broker configuration component 860 as described with reference to FIG. 8.

At 1230, the method may include enabling the data synchronization between the first database and the second database after restoring the second database. The operations of 1230 may be performed in accordance with examples as disclosed herein. In some examples, aspects of the operations of 1230 may be performed by a synchronization component 835 as described with reference to FIG. 8.

Figure 13:
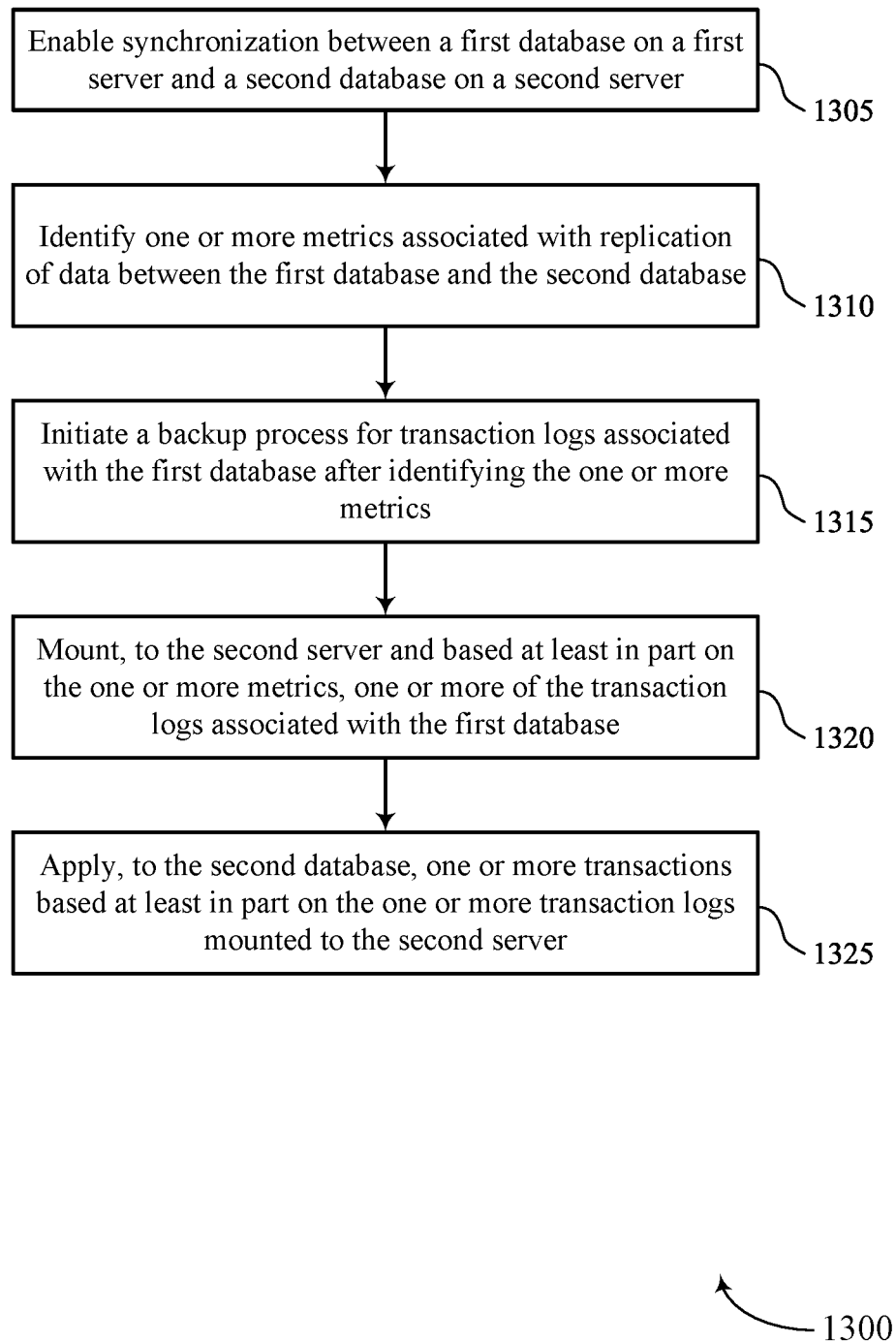

FIG. 13 shows a flowchart illustrating a method 1300 that supports life cycle management for standby databases in accordance with aspects of the present disclosure. The operations of the method 1300 may be implemented by a data management system or its components as described herein. For example, the operations of the method 1300 may be performed by a data management system as described with reference to FIGS. 1 through 9. In some examples, a data management system may execute a set of instructions to control the functional elements of the data management system to perform the described functions. Additionally or alternatively, the data management system may perform aspects of the described functions using special-purpose hardware.

At 1305, the method may include enabling synchronization between a first database on a first server and a second database on a second server. The operations of 1305 may be performed in accordance with examples as disclosed herein. In some examples, aspects of the operations of 1305 may be performed by a synchronization component 835 as described with reference to FIG. 8.

At 1310, the method may include identifying one or more metrics associated with replication of data between the first database and the second database. The operations of 1310 may be performed in accordance with examples as disclosed herein. In some examples, aspects of the operations of 1310 may be performed by a replication metric component 845 as described with reference to FIG. 8.

At 1315, the method may include initiating a backup process for transaction logs associated with the first database after identifying the one or more metrics. The operations of 1315 may be performed in accordance with examples as disclosed herein. In some examples, aspects of the operations of 1315 may be performed by a backup component 825 as described with reference to FIG. 8.

At 1320, the method may include mounting, to the second server and based at least in part on the one or more metrics, one or more of the transaction logs associated with the first database. The operations of 1320 may be performed in accordance with examples as disclosed herein. In some examples, aspects of the operations of 1320 may be performed by a mount manager 830 as described with reference to FIG. 8.

At 1325, the method may include applying, to the second database, one or more transactions based at least in part on the one or more transaction logs mounted to the second server. The operations of 1325 may be performed in accordance with examples as disclosed herein. In some examples, aspects of the operations of 1325 may be performed by a transaction component 850 as described with reference to FIG. 8.

Figure 14:
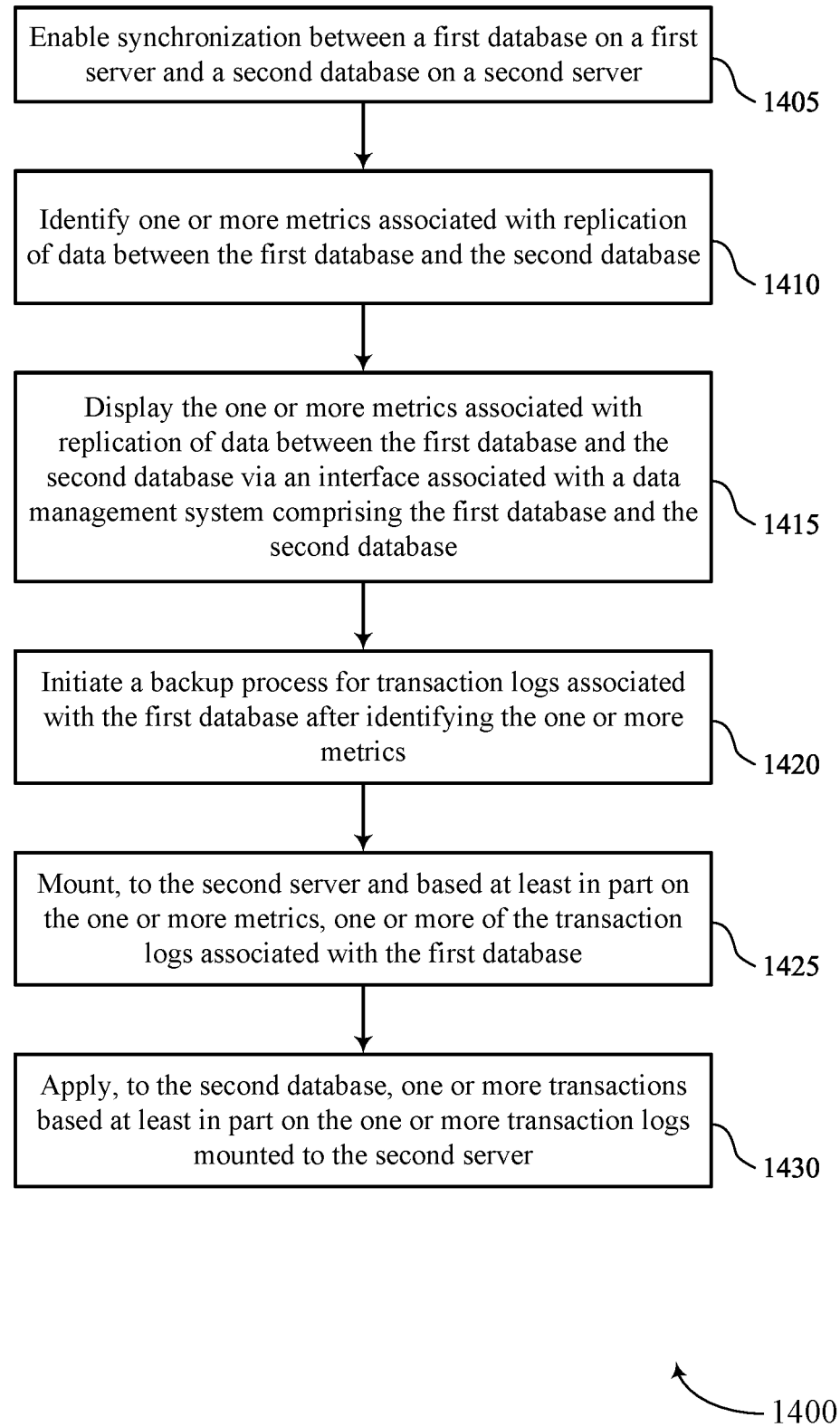

FIG. 14 shows a flowchart illustrating a method 1400 that supports life cycle management for standby databases in accordance with aspects of the present disclosure. The operations of the method 1400 may be implemented by a data management system or its components as described herein. For example, the operations of the method 1400 may be performed by a data management system as described with reference to FIGS. 1 through 9. In some examples, a data management system may execute a set of instructions to control the functional elements of the data management system to perform the described functions. Additionally or alternatively, the data management system may perform aspects of the described functions using special-purpose hardware.

At 1405, the method may include enabling synchronization between a first database on a first server and a second database on a second server. The operations of 1405 may be performed in accordance with examples as disclosed herein. In some examples, aspects of the operations of 1405 may be performed by a synchronization component 835 as described with reference to FIG. 8.

At 1410, the method may include identifying one or more metrics associated with replication of data between the first database and the second database. The operations of 1410 may be performed in accordance with examples as disclosed herein. In some examples, aspects of the operations of 1410 may be performed by a replication metric component 845 as described with reference to FIG. 8.

At 1415, the method may include displaying the one or more metrics associated with replication of data between the first database and the second database via an interface associated with the data management system comprising the first database and the second database. The operations of 1415 may be performed in accordance with examples as disclosed herein. In some examples, aspects of the operations of 1415 may be performed by a replication metric component 845 as described with reference to FIG. 8.

At 1420, the method may include initiating a backup process for transaction logs associated with the first database after identifying the one or more metrics. The operations of 1420 may be performed in accordance with examples as disclosed herein. In some examples, aspects of the operations of 1420 may be performed by a backup component 825 as described with reference to FIG. 8.

At 1425, the method may include mounting, to the second server and based at least in part on the one or more metrics, one or more of the transaction logs associated with the first database. The operations of 1425 may be performed in accordance with examples as disclosed herein. In some examples, aspects of the operations of 1425 may be performed by a mount manager 830 as described with reference to FIG. 8.

At 1430, the method may include applying, to the second database, one or more transactions based at least in part on the one or more transaction logs mounted to the second server. The operations of 1430 may be performed in accordance with examples as disclosed herein. In some examples, aspects of the operations of 1430 may be performed by a transaction component 850 as described with reference to FIG. 8.

A method is described. The method may include acquiring a snapshot of a state of a first database hosted by a first server, mounting the snapshot of the state of the first database to a second server, wherein, once mounted on the second server, the snapshot corresponds to an instance of a second database, configuring the first database and the instance of the second database to support data synchronization between the first database and the second database, restoring, using the instance of the second database, the second database to the second server based at least in part on configuring the first database and the instance of the second database to support the data synchronization, wherein the second database replicates the state of the first database, and enabling the data synchronization between the first database and the second database after restoring the second database.

An apparatus is described. The apparatus may include a processor, memory coupled with the processor, and instructions stored in the memory. The instructions may be executable by the processor to cause the apparatus to acquire a snapshot of a state of a first database hosted by a first server, mount the snapshot of the state of the first database to a second server, wherein, once mounted on the second server, the snapshot corresponds to an instance of a second database, configure the first database and the instance of the second database to support data synchronization between the first database and the second database, restore, using the instance of the second database, the second database to the second server based at least in part on configuring the first database and the instance of the second database to support the data synchronization, wherein the second database replicates the state of the first database, and enable the data synchronization between the first database and the second database after restoring the second database.

Another apparatus is described. The apparatus may include means for acquiring a snapshot of a state of a first database hosted by a first server, means for mounting the snapshot of the state of the first database to a second server, wherein, once mounted on the second server, the snapshot corresponds to an instance of a second database, means for configuring the first database and the instance of the second database to support data synchronization between the first database and the second database, means for restoring, using the instance of the second database, the second database to the second server based at least in part on configuring the first database and the instance of the second database to support the data synchronization, wherein the second database replicates the state of the first database, and means for enabling the data synchronization between the first database and the second database after restoring the second database.

A non-transitory computer-readable medium storing code is described. The code may include instructions executable by a processor to acquire a snapshot of a state of a first database hosted by a first server, mount the snapshot of the state of the first database to a second server, wherein, once mounted on the second server, the snapshot corresponds to an instance of a second database, configure the first database and the instance of the second database to support data synchronization between the first database and the second database, restore, using the instance of the second database, the second database to the second server based at least in part on configuring the first database and the instance of the second database to support the data synchronization, wherein the second database replicates the state of the first database, and enable the data synchronization between the first database and the second database after restoring the second database.

Some examples of the method, apparatuses, and non-transitory computer-readable medium described herein may further include operations, features, means, or instructions for verifying compatibility between the first server and the second server within a data management system, wherein acquiring the snapshot of the state of the first database may be based at least in part on verifying the compatibility between the first server and the second server.

Some examples of the method, apparatuses, and non-transitory computer-readable medium described herein may further include operations, features, means, or instructions for verifying one or more prerequisite parameters associated with the first database, the first server, the second server, or any combination thereof, wherein acquiring the snapshot of the state of the first database may be based at least in part on verifying the one or more prerequisite parameters associated with the first database, the first server, the second server, or any combination thereof.

In some examples of the method, apparatuses, and non-transitory computer-readable medium described herein, the one or more prerequisite parameters comprise a mode, a storage capacity, a state of software, or any combination thereof associated with the first database, the first server, the second server, or any combination thereof.

In some examples of the method, apparatuses, and non-transitory computer-readable medium described herein, mounting the snapshot of the state of the first database to the second server may include operations, features, means, or instructions for removing, based at least in part on acquiring the snapshot of the state of the first database, a first mount of one or more files from the second server and mounting the snapshot of the state of the second database to the second server after removing the first mount of the one or more files from the second server.

Some examples of the method, apparatuses, and non-transitory computer-readable medium described herein may further include operations, features, means, or instructions for configuring, after restoring the second database to the second server, a broker between the first server and the second server, wherein the broker may be configured to manage metadata for a data management system comprising the first server and the second server.

In some examples of the method, apparatuses, and non-transitory computer-readable medium described herein, configuring the first database and the instance of the second database to support the data synchronization may include operations, features, means, or instructions for applying a first set of one or more configuration settings to the first database and applying a second set of one or more configuration settings to the second database, wherein the first and second sets of one or more configuration settings may be applied while the data synchronization may be disabled.

In some examples of the method, apparatuses, and non-transitory computer-readable medium described herein, enabling the data synchronization between the first database and the second database may include operations, features, means, or instructions for enabling the data synchronization between the first database and the second database in accordance with the first set of one or more configuration settings and the second set of one or more configuration settings.

In some examples of the method, apparatuses, and non-transitory computer-readable medium described herein, enabling the data synchronization between the first database and the second database may include operations, features, means, or instructions for verifying that a time period between acquiring the snapshot of the state of the first database and restoring the instance of the second database to the second server may be less than a threshold time period and enabling the data synchronization between the first database and the second database based at least in part on verifying that the time period may be less than the threshold time period.

A method for data management is described. The method may include enabling synchronization between a first database on a first server and a second database on a second server, identifying one or more metrics associated with replication of data between the first database and the second database, initiating a backup process for transaction logs associated with the first database after identifying the one or more metrics, mounting, to the second server and based at least in part on the one or more metrics, one or more of the transaction logs associated with the first database, and applying, to the second database, one or more transactions based at least in part on the one or more transaction logs mounted to the second server.

An apparatus for data management is described. The apparatus may include a processor, memory coupled with the processor, and instructions stored in the memory. The instructions may be executable by the processor to cause the apparatus to enable synchronization between a first database on a first server and a second database on a second server, identify one or more metrics associated with replication of data between the first database and the second database, initiate a backup process for transaction logs associated with the first database after identifying the one or more metrics, mount, to the second server and based at least in part on the one or more metrics, one or more of the transaction logs associated with the first database, and apply, to the second database, one or more transactions based at least in part on the one or more transaction logs mounted to the second server.

Another apparatus for data management is described. The apparatus may include means for enabling synchronization between a first database on a first server and a second database on a second server, means for identifying one or more metrics associated with replication of data between the first database and the second database, means for initiating a backup process for transaction logs associated with the first database after identifying the one or more metrics, means for mounting, to the second server and based at least in part on the one or more metrics, one or more of the transaction logs associated with the first database, and means for applying, to the second database, one or more transactions based at least in part on the one or more transaction logs mounted to the second server.

A non-transitory computer-readable medium storing code for data management is described. The code may include instructions executable by a processor to enable synchronization between a first database on a first server and a second database on a second server, identify one or more metrics associated with replication of data between the first database and the second database, initiate a backup process for transaction logs associated with the first database after identifying the one or more metrics, mount, to the second server and based at least in part on the one or more metrics, one or more of the transaction logs associated with the first database, and apply, to the second database, one or more transactions based at least in part on the one or more transaction logs mounted to the second server.

In some examples of the method, apparatuses, and non-transitory computer-readable medium described herein, identifying the one or more metrics associated with replication of data between the first database and the second database may include operations, features, means, or instructions for acquiring metadata associated with the first database and the second database and identifying the one or more metrics associated with replication of data between the first database and the second database based at least in part on the acquired metadata.

Some examples of the method, apparatuses, and non-transitory computer-readable medium described herein may further include operations, features, means, or instructions for displaying the one or more metrics associated with replication of data between the first database and the second database via an interface associated with a data management system comprising the first database and the second database.

In some examples of the method, apparatuses, and non-transitory computer-readable medium described herein, displaying the one or more metrics associated with replication of data between the first database and the second database via the interface may include operations, features, means, or instructions for displaying the one or more metrics periodically, or displaying the one or more metrics semi-statically, or displaying the one or more metrics in response to an input signal from a DBA associated with the data management system, or any combination thereof.

Some examples of the method, apparatuses, and non-transitory computer-readable medium described herein may further include operations, features, means, or instructions for receiving, via the interface, an input signal in response to displaying the one or more metrics, wherein mounting the one or more transaction logs associated with the first database to the second server may be based at least in part on the input signal.

In some examples of the method, apparatuses, and non-transitory computer-readable medium described herein, mounting the one or more transaction logs associated with the first database to the second server may include operations, features, means, or instructions for determining that a value of the one or more metrics associated with replication of data between the first database and the second database satisfies a threshold value and mounting the one or more transaction logs associated with the first database to the second server based at least in part on determining that the value of the one or more metrics satisfies the threshold value, wherein the threshold value may be associated with a threshold duration of time, a threshold severity, or both.

In some examples of the method, apparatuses, and non-transitory computer-readable medium described herein, mounting the one or more transaction logs associated with the first database to the second server may include operations, features, means, or instructions for removing, based at least in part on identifying the one or more metrics associated with replication of data between the first database and the second database, a first mount of one or more files from the second server and mounting the one or more transaction logs associated with the first database to the second server based at least in part on removing the first mount of the one or more files from the second server.

In some examples of the method, apparatuses, and non-transitory computer-readable medium described herein, applying the one or more transactions to the second database may include operations, features, means, or instructions for restoring the one or more transaction logs to the second database, applying, to the second database, the one or more transactions based at least in part on the one or more transaction logs restored to the second database, wherein the one or more transaction logs restored to the second database may be associated with a second state of the first database, the second state of the first database subsequent to a first state of the first database, and wherein the one or more transaction logs, once applied to the second database, may override one or more first transaction logs associated with the first state of the first database.

In some examples of the method, apparatuses, and non-transitory computer-readable medium described herein, the one or more metrics correspond to a timing associated with replication of data between the first database and the second database, a mode of replication of data between the first database and the second database, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    verifying compatibility between a first server and a second server within a data management system;
    acquiring a snapshot of a state of a first database hosted by the first server based at least in part on verifying the compatibility between the first server and the second server;
    mounting the snapshot of the state of the first database to the second server, wherein, once mounted on the second server, the snapshot corresponds to an instance of a second database;
    applying, prior to enabling data synchronization between the first database and the instance of the second database, one or more configuration settings to the first database and the instance of the second database to support the data synchronization between the first database and the second database, the one or more configuration settings configured to facilitate replication of data from the first database to the second database;
    restoring, prior to enabling the data synchronization and using the instance of the second database, the second database to the second server based at least in part on applying the one or more configuration settings to the first database and the instance of the second database to support the data synchronization, wherein the second database replicates the state of the first database; and enabling, after restoring the second database, the data synchronization between the first database and the second database in accordance with the one or more configuration settings.

2. The method of claim 1, further comprising:

verifying one or more prerequisite parameters associated with the first database, the first server, the second server, or any combination thereof, wherein acquiring the snapshot of the state of the first database is based at least in part on verifying the one or more prerequisite parameters associated with the first database, the first server, the second server, or any combination thereof.

3. The method of claim 2, wherein the one or more prerequisite parameters comprise a mode, a storage capacity, a state of software, or any combination thereof associated with the first database, the first server, the second server, or any combination thereof.

4. The method of claim 1, wherein mounting the snapshot of the state of the first database to the second server comprises:

removing, based at least in part on acquiring the snapshot of the state of the first database, a first mount of one or more files from the second server; and mounting the snapshot of the state of the second database to the second server after removing the first mount of the one or more files from the second server.

5. The method of claim 1, further comprising:

configuring, after restoring the second database to the second server, a broker between the first server and the second server, wherein the broker is configured to manage metadata for the data management system comprising the first server and the second server.

6. The method of claim 1, wherein applying, while the data synchronization is disabled between the first database and the instance of the second database, the one or more configuration settings to the first database and the instance of the second database to support the data synchronization comprises:

applying a first set of one or more configuration settings to the first database; and applying a second set of one or more configuration settings to the second database.

7. The method of claim 6, wherein enabling the data synchronization between the first database and the second database comprises:

enabling the data synchronization between the first database and the second database in accordance with the first set of one or more configuration settings and the second set of one or more configuration settings.

8. The method of claim 1, wherein enabling the data synchronization between the first database and the second database comprises:

verifying that a time period between acquiring the snapshot of the state of the first database and restoring the instance of the second database to the second server is less than a threshold time period; and enabling the data synchronization between the first database and the second database based at least in part on verifying that the time period is less than the threshold time period.

9. A method for data management, comprising:

enabling synchronization between a first database on a first server and a second database on a second server;

identifying one or more metrics associated with replication of data between the first database and the second database, wherein the one or more metrics correspond to a timing associated with replication of data between the first database and the second database, a mode of replication of data between the first database and the second database, or both;

initiating a backup process for transaction logs associated with the first database after identifying the one or more metrics;

mounting, to the second server and based at least in part on a value of the one or more metrics associated with the replication of the data between the first database and the second database satisfying a threshold value, one or more of the transaction logs associated with transactions performed at the first database; and applying, to the second database, one or more transactions based at least in part on the one or more transaction logs mounted to the second server.

10. The method of claim 9, wherein identifying the one or more metrics associated with replication of data between the first database and the second database comprises:

acquiring metadata associated with the first database and the second database; and identifying the one or more metrics associated with replication of data between the first database and the second database based at least in part on the acquired metadata.

11. The method of claim 9, further comprising:

displaying the one or more metrics associated with replication of data between the first database and the second database via an interface associated with a data management system comprising the first database and the second database.

12. The method of claim 11, wherein displaying the one or more metrics associated with replication of data between the first database and the second database via the interface comprises:

displaying the one or more metrics periodically; or displaying the one or more metrics semi-statically; or displaying the one or more metrics in response to an input signal from a DBA associated with the data management system; or any combination thereof.

13. The method of claim 11, further comprising:

receiving, via the interface, an input signal in response to displaying the one or more metrics, wherein mounting the one or more transaction logs associated with the first database to the second server is based at least in part on the input signal.

14. The method of claim 9, wherein the threshold value is associated with a threshold duration of time, a threshold severity, or both.

15. The method of claim 9, wherein mounting the one or more transaction logs associated with the first database to the second server comprises:

removing, based at least in part on identifying the one or more metrics associated with replication of data between the first database and the second database, a first mount of one or more files from the second server; and mounting the one or more transaction logs associated with the first database to the second server based at least in part on removing the first mount of the one or more files from the second server.

16. The method of claim 9, wherein applying the one or more transactions to the second database comprises:

restoring the one or more transaction logs to the second database; and applying, to the second database, the one or more transactions based at least in part on the one or more transaction logs restored to the second database, wherein:
- the one or more transaction logs restored to the second database are associated with a second state of the first database, the second state of the first database subsequent to a first state of the first database; and
- the one or more transaction logs, once applied to the second database, override one or more first transaction logs associated with the first state of the first database.

17. An apparatus, comprising:

a processor;

memory coupled with the processor; and instructions stored in the memory and executable by the processor to cause the apparatus to:
- verify compatibility between a first server and a second server within a data management system;
- acquire a snapshot of a state of a first database hosted by the first server based at least in part on verifying the compatibility between the first server and the second server;
- mount the snapshot of the state of the first database to the second server, wherein, once mounted on the second server, the snapshot corresponds to an instance of a second database;
- apply, prior to enabling data synchronization between the first database and the instance of the second database, one or more configuration settings to the first database and the instance of the second database to support the data synchronization between the first database and the second database, the one or more configuration settings configured to facilitate replication of data from the first database to the second database;
- restore, prior to enabling the data synchronization and using the instance of the second database, the second database to the second server based at least in part on applying the one or more configuration settings to the first database and the instance of the second database to support the data synchronization, wherein the second database replicates the state of the first database; and enable, after restoring the second database, the data synchronization between the first database and the second database in accordance with the one or more configuration settings.

18. An apparatus for data management, comprising:

a processor;

memory coupled with the processor; and instructions stored in the memory and executable by the processor to cause the apparatus to:
- enable synchronization between a first database on a first server and a second database on a second server;
- identify one or more metrics associated with replication of data between the first database and the second database, wherein the one or more metrics correspond to a timing associated with replication of data between the first database and the second database, a mode of replication of data between the first database and the second database, or both;
- initiate a backup process for transaction logs associated with the first database after identifying the one or more metrics;
- mount, to the second server and based at least in part on a value of the one or more metrics associated with the replication of the data between the first database and the second database satisfying a threshold value, one or more of the transaction logs associated with transactions at the first database; and
- apply, to the second database, one or more transactions based at least in part on the one or more transaction logs mounted to the second server.

\* \* \* \* \*